United States Patent
Wu et al.

(10) Patent No.: US 10,129,862 B1
(45) Date of Patent: Nov. 13, 2018

(54) METHODS, DEVICES, APPARATUS, AND SYSTEMS FOR MEDIUM ACCESS CONTROL IN WIRELESS COMMUNICATION SYSTEMS UTILIZING SPATIAL FOCUSING EFFECT

(71) Applicant: Origin Wireless, Inc., Greenbelt, MD (US)

(72) Inventors: Zhung-Han Wu, Laurel, MD (US); Beibei Wang, Clarksville, MD (US); Chunxiao Jiang, Beijing (CN); Zoltan Safar, Ellicott City, MD (US); K. J. Ray Liu, Potomac, MD (US)

(73) Assignee: Origin Wireless, Inc., Greenbelt, MD (US)

( * ) Notice: Subject to any disclaimer, the term of this patent is extended or adjusted under 35 U.S.C. 154(b) by 106 days.

(21) Appl. No.: 15/434,813

(22) Filed: Feb. 16, 2017

Related U.S. Application Data

(60) Provisional application No. 62/320,965, filed on Apr. 11, 2016, provisional application No. 62/295,970, filed on Feb. 16, 2016.

(51) Int. Cl.
*H04W 72/04* (2009.01)
*H04W 72/12* (2009.01)
(Continued)

(52) U.S. Cl.
CPC ........ *H04W 72/042* (2013.01); *H04B 7/0456* (2013.01); *H04B 17/318* (2015.01);
(Continued)

(58) Field of Classification Search
CPC ........... H04W 72/042; H04W 72/0446; H04W 72/0453; H04W 72/1236; H04W 28/0268;
(Continued)

(56) References Cited

U.S. PATENT DOCUMENTS 2,933,702 A   4/1960 Bogert
3,767,855 A   10/1973 Ueno et al.
(Continued)

FOREIGN PATENT DOCUMENTS

EP     2 571 214 A1   11/2012
WO     WO 2007/031088   3/2007
(Continued)

OTHER PUBLICATIONS

U.S. Appl. No. 13/706,342, filed Dec. 5, 2012, Yang et al.
(Continued)

*Primary Examiner* — Peter Chen
(74) *Attorney, Agent, or Firm* — Fish & Richardson P.C.

(57) ABSTRACT

A base station of a time reversal communication system is provided. The base station receives a set of channel probing signals from a set of terminal devices, determines channel impulse responses based on the channel probing signals, and determines location-specific signature waveforms based on the channel impulse responses, in which each of the location-specific signature waveforms is associated with a particular location of the respective terminal device. The base station generates a set of medium access layer parameters, in which each medium access layer parameter is associated with a particular one of the terminal devices. For each terminal device, the base station generates transmit data signals based on data intended for the terminal device, and the medium access layer parameter and the location-specific signature waveform associated with the terminal device. The base station transmits the transmit data signals wirelessly to the terminal devices.

21 Claims, 19 Drawing Sheets

```
Algorithm 1 Centralized Network Association Protocol
1: /**** Channel Probing Phase ****/
2: The new arrival UE j broadcasts an impulse signal.
3: The BSs calculate the CSI and estimate the distance according to the signal strength.
4: /** BS Association Phase **/
5. All the BSs report the distance and load information to the central server.
6: The server calculates the parameters ξ₁, ξ₂, ξ₃ using (7a-7c) for TR wideband systems or using (9) for massive MIMO systems.
7: The server compares the overall expected throughput using (14), decides an optimal BS for the new UE, and then notifies the optimal BS.
8: The optimal BS sends a synchronization signal to the new UE to establish connection.
9: /**** BS Association Phase ****/
10: The optimal BS transmits data to the associated UEs concurrently.
```

Centralized Network Association Protocol

```
Algorithm 2 Distributed Network Association Protocol
1: /** BS Association Phase **/
2: The BS broadcasts the beacon signal with load status.
3: The new arrival UE detects the beacon signals and estimates the distance to the BSs.
4: The new UE calculates a priority list of BSs according to (16).
5: The new UE sequentially sends a request to the BSs on the list until a confirmation is received.
6: The BS decides whether to send a confirmation to the new UE according to the constraints in (16).
7: /** Channel probing phase **/
8. The new UE sends an impulse signal to the confirmed BS.
9: The confirmed BS records the CSI and utilizes it for waveform or beamforming design.
10: /** Data transmission phase **/
11: The optimal BS transmits data to the associated UEs concurrently.
```

Distributed Network Association Protocol

(51) Int. Cl.
| | |
|---|---|
| *H04B 7/0456* | (2017.01) |
| *H04B 17/318* | (2015.01) |
| *H04B 17/336* | (2015.01) |
| *H04L 25/02* | (2006.01) |
| *H04W 28/02* | (2009.01) |
| *H04W 48/16* | (2009.01) |
| *H04W 48/10* | (2009.01) |
| *H04L 12/26* | (2006.01) |
| *H04W 88/08* | (2009.01) |

(52) U.S. Cl.
CPC ....... *H04B 17/336* (2015.01); *H04L 25/0212* (2013.01); *H04L 43/0805* (2013.01); *H04L 43/087* (2013.01); *H04L 43/0823* (2013.01); *H04L 43/0858* (2013.01); *H04L 43/0888* (2013.01); *H04W 28/0268* (2013.01); *H04W 48/10* (2013.01); *H04W 48/16* (2013.01); *H04W 72/0446* (2013.01); *H04W 72/0453* (2013.01); *H04W 72/1236* (2013.01); *H04W 88/08* (2013.01)

(58) Field of Classification Search
CPC ..... H04W 48/16; H04W 48/10; H04W 88/08; H04L 25/0212; H04L 43/0823; H04L 43/0888; H04L 43/0858; H04L 43/0805; H04L 43/087; H04B 7/0456; H04B 17/318; H04B 17/336
See application file for complete search history.

(56) References Cited

U.S. PATENT DOCUMENTS

| | | | |
|---|---|---|---|
| 5,092,336 | A | 3/1992 | Fink |
| 5,155,742 | A | 10/1992 | Ariyavisitakul et al. |
| 5,428,999 | A | 7/1995 | Fink |
| 5,926,768 | A | 7/1999 | Lewiner et al. |
| 6,301,291 | B1 | 10/2001 | Rouphael et al. |
| 6,490,469 | B2 | 12/2002 | Candy |
| 6,862,326 | B1 | 3/2005 | Eran et al. |
| 7,362,815 | B2 | 4/2008 | Lindskog et al. |
| 7,440,766 | B1 | 10/2008 | Tuovinen et al. |
| 7,460,605 | B2 | 12/2008 | Candy et al. |
| 7,463,690 | B2 | 12/2008 | Candy et al. |
| 7,587,291 | B1 | 9/2009 | Sarvazyan et al. |
| 7,768,876 | B2 | 8/2010 | Dahl et al. |
| 8,195,112 | B1 | 6/2012 | Zhang et al. |
| 8,346,197 | B2 | 1/2013 | Huy et al. |
| 8,411,765 | B2 | 4/2013 | Smith et al. |
| 8,451,181 | B2 | 5/2013 | Huy et al. |
| 8,457,217 | B2 | 6/2013 | Huy et al. |
| 8,498,658 | B2 | 7/2013 | Smith et al. |
| 8,593,998 | B2 | 11/2013 | Huy et al. |
| 8,743,976 | B2 | 6/2014 | Smith et al. |
| 8,792,396 | B2 | 7/2014 | Huy et al. |
| 8,831,164 | B2 | 9/2014 | Lu |
| 9,226,304 | B2 | 12/2015 | Chen et al. |
| 9,313,020 | B2 | 4/2016 | Ma et al. |
| 9,402,245 | B2 | 7/2016 | Chen et al. |
| 9,407,306 | B2 | 8/2016 | Yang et al. |
| 9,559,874 | B2 | 1/2017 | Han et al. |
| 2003/0138053 | A1 | 7/2003 | Candy et al. |
| 2004/0156443 | A1 | 8/2004 | Dent |
| 2006/0098746 | A1 | 5/2006 | Candy et al. |
| 2006/0115031 | A1 | 6/2006 | Lindskog et al. |
| 2010/0302977 | A1 | 12/2010 | Huy et al. |
| 2010/0309829 | A1 | 12/2010 | Huy et al. |
| 2012/0155515 | A1 | 6/2012 | Smith et al. |
| 2012/0183037 | A1 | 7/2012 | Allpress et al. |
| 2012/0207234 | A1 | 8/2012 | De Rosny et al. |
| 2012/0257660 | A1 | 10/2012 | Smith et al. |
| 2012/0263056 | A1 | 10/2012 | Smith et al. |
| 2012/0328037 | A1 | 12/2012 | Hsu et al. |
| 2013/0201958 | A1* | 8/2013 | Phan Huy ............ H04B 7/0413 370/329 |
| 2013/0223503 | A1 | 8/2013 | Smith et al. |
| 2014/0022128 | A1 | 1/2014 | Smith |
| 2014/0126567 | A1 | 5/2014 | Husain et al. |
| 2014/0185596 | A1 | 7/2014 | Han et al. |
| 2015/0049745 | A1* | 2/2015 | Han ......................... H04L 1/00 370/337 |
| 2015/0049792 | A1 | 2/2015 | Han et al. |
| 2015/0236848 | A1* | 8/2015 | Ma .......................... H04L 7/042 370/328 |
| 2016/0018508 | A1 | 1/2016 | Chen et al. |
| 2016/0021670 | A1 | 1/2016 | Yang et al. |
| 2016/0164669 | A1 | 6/2016 | Ma et al. |
| 2016/0164767 | A1 | 6/2016 | Ma et al. |
| 2016/0205569 | A1 | 7/2016 | Han et al. |
| 2016/0315797 | A1 | 10/2016 | Yang et al. |
| 2016/0316454 | A1 | 10/2016 | Chen et al. |

FOREIGN PATENT DOCUMENTS

| | | |
|---|---|---|
| WO | WO 2011/029072 | 3/2011 |
| WO | WO 2011/029075 | 3/2011 |
| WO | WO 2012/151316 | 11/2012 |
| WO | WO 2013/126054 | 8/2013 |
| WO | WO 2016/011433 | 1/2016 |

OTHER PUBLICATIONS

U.S. Appl. No. 14/605,611, filed Jan. 26, 2015, Chen et al.
U.S. Appl. No. 15/004,314, filed Jan. 22, 2016, Chen et al.
U.S. Appl. No. 15/004,335, filed Jan. 22, 2016, Chen et al.
U.S. Appl. No. 15/061,059, filed Mar. 4, 2016, Ma et al.
U.S. Appl. No. 15/268,477, filed Sep. 16, 2016, Han et al.
U.S. Appl. No. 15/284,496, filed Oct. 3, 2016, Han et al.
Abbasi-Moghadam, D. et al., "A SIMO one-bit time reversal for UWB communication systems", EURASIP J. Wireless Comm. and Networking, 2012:113, 2012.
Albert, D. G. et al., "Time Reversal processing for source location in an urban environment (L)", J. Acoust. Soc. Am., vol. 118(2):616-619, Aug. 2005.
Brysev, A. P. et al., "Wave phase conjugation in ultrasonic beams", Physics-Uspekhi, vol. 41(8):793-805, 1998.
Chang, Y.-H. et al., "Ultrawideband Transceiver Design Using Channel Phase Precoding", IEEE Trans. Sig. Proc., vol. 55(7):3807-3822, Jul. 2007.
Chen, Y. et al., "Time-reversal wideband communications," IEEE Signal Processing Letters, vol. 20(12):1219-1222, Dec. 2013.
Chen, Y. et al., "Time-Reversal Wireless Paradigm for Green Internet of Things: An Overview", IEEE Internet of Things Journal, vol. 1(1):81-98, Feb. 2014.
Daniels, R.C. et al., "Improving on Time-reversal with MISO Precoding," Proceedings of the Eighth International Symposium on Wireless Personal Communications Conference, Aalborg, Denmark, 5 pages, Sep. 18-22, 2005.
Daniels, R.C. et al., "MISO Precoding for Temporal and Spatial Focusing" in the Proceedings of the Eighth International Symposium on Wireless Personal Communications Conference, Aalborg, Denmark, 6 pages, Sep. 18-22, 2005.
De Rosny, J. et al., "Theory of Electromagnetic Time-Reversal Mirrors", IEEE Trans. Antennas Propag., vol. 58(10):3139-3149, Oct. 2010.
Derode, A. et al., "Ultrasonic pulse compression with one-bit time reversal through multiple scattering", J. Appl. Phys., vol. 85(9):6343-6352, May 1999.
Derode, A. et al., "Taking Advantage of Multiple Scattering to Communicate with Time-Reversal Antennas", Phys. Rev. Lett., vol. 90(1): 014301-1-4, Jan. 2003.
Derode, A. et al., "Robust Acoustic Time Reversal and High-Order Multiple Scattering", Phys. Rev. Lett., vol. 75(23):4206-4210, Dec. 1995.
Dorme, C. et al., "Focusing in transmit-receive mode through inhomogeneous media: The time reversal matched filter approach", J. Acoust. Soc. Am., vol. 98(2):1155-1162, Pt. 1, Aug. 1995.

(56) References Cited

OTHER PUBLICATIONS

Edelmann, G.F. et al., "An Initial Demonstration of Underwater Acoustic Communication Using Time Reversal", IEEE Journal of Oceanic Engineering, vol. 27(3):602-609, Jul. 2002.
Emami, M. et al., "Matched Filtering with Rate Back-off for Low Complexity Communications in Very Large Delay Spread Channels," 38th Asilomar Conference on Signals, Systems and Computers, pp. 218-222, 2004.
Emami, S.M. et al., "Predicted Time Reversal Performance in Wireless Communications using Channel Measurements", publication details unknown.
Fink, M. et al., "Acoustic Time-Reversal Mirrors", Inverse Problems, vol. 17:R1-R38, 2001.
Fink, M., "Time Reversal of Ultrasonic Fields-Part I: Basic Principals", IEEE Trans. Ultrasonics, Ferroelectrics and Freq. Contr., vol. 39(5):555-566, Sep. 1992.
Fink, M., "Time-Reversal Mirrors", J. Phys. D: Appl. Phys., vol. 26:1333-1350, 1993.
Fink, M., "Time-Reversed Acoustics", Scientific American, pp. 91-97, Nov. 1999.
Fink, M. et al., "Self focusing in inhomogeneous media with time reversal acoustic mirrors," IEEE Ultrasonics Symposium, vol. 1:681-686, 1989.
Fontana, R.J. et al., "Ultra-Wideband Precision Asset Location System", Proc. of the IEEE Conf. on UWB Sys. and Tech., pp. 147-150, 2002.
Guo, N. et al., "Reduced-Complexity UWB Time-Reversal Techniques and Experimental Results", IEEE Trans. On Wireless Comm., vol. 6(12):4221-4226, Dec. 2007.
Han, F. et al., "A multiuser TRDMA uplink system with 2D parallel interference cancellation," IEEE Transactions on Communications, vol. 62(3):1011-1022, Mar. 2014.
Han, F. et al., "An Interference Cancellation Scheme for the Multiuser TRDMA Uplink System," Global Telecommunications Conference, pp. 3583-3588, 2013.
Han, F., "Energy Efficient Optimization in Green Wireless Networks", University of Maryland Ph. D. Dissertation, 2013.
Han, F., et al., "Time-reversal division multiple access in multi-path channels," Global Telecommunications Conference, pp. 1-5, Dec. 2011.
Han, F. et al. "Time-reversal division multiple access over multi-path channels," IEEE Transactions on Communications, vol. 60(7):1953-1965, Jul. 2012.
Han, Y. et al., "Time-Reversal with Limited Signature Precision: Tradeoff Between Complexity and Performance", Proc. IEEE Global Conference on Signal and Information Processing (GlobalSIP), Atlanta, Dec. 2014.
Henty, B.E. and D.D. Stancil, "Multipath-Enabled Super-Resolution for rf and Microwave Communication using Phase-Conjugate Arrays", Phys. Rev. Lett., vol. 93, 243904, Dec. 2004.
Jin, Y. et al., "Time-Reversal Detection Using Antenna Arrays", IEEE Trans. Signal Processing, vol. 57(4):1396-1414, Apr. 2009.
Jin, Y. et al., "Adaptive time reversal beamforming in dense multipath communication networks," 2008 42nd Asilomar Conference on Signals, Systems and Computers, pp. 2027-2031, Oct. 2008.
Khalegi, A. et al., "Demonstration of Time-Reversal in Indoor Ultra-Wideband Communication: Time Domain Measurement", IEEE Proc. of ISWCS, pp. 465-468, 2007.
Kuperman, W.A. et al., "Phase conjugation in the ocean: Experimental demonstration of an acoustic time-reversal mirror", J. Acoust. Soc. Am., vol. 103(1), pp. 25-40, Jan. 1998.
Kyritsi, P. et al., "One-bit Time Reversal for WLAN Applications", IEEE 16$^{th}$ Intern. Symp. On Personal, Indoor and Mobile Radio Comm., pp. 532-536, 2005.
Kyritsi, P. et al., "Time reversal and zero-forcing equalization for fixed wireless access channels," 39th Asilomar Conference on Signals, Systems and Computers, pp. 1297-1301, 2005.
Kyritsi, P. et al., "Time reversal techniques for wireless communications," IEEE Vehicular Technology Conference, vol. 1:47-51, 2004.
Lemoult, F. et al., "Manipulating Spatiotemporal Degrees of Freedom in Waves of Random Media", Phys. Rev. Lett., vol. 103, 173902, Oct. 2009.
Lemoult, F. et al., "Resonant Metalenses for Breaking the Diffraction Barrier", Phys. Rev. Lett., vol. 104, 203901, May 2010.
Lerosey, G. et al., "Time Reversal of Electromagnetic Waves and Telecommunication", Radio Science, vol. 40, RS6S12, 2005.
Lerosey, G. et al., "Time Reversal of Electromagnetic Waves", Phys. Rev. Lett., vol. 92(19), 193904, May 2004.
Lerosey, G. et al., "Time Reversal of Wideband Microwaves", Appl. Phys. Lett., vol. 88, 154101, Apr. 2006.
Lerosey, G. et al., "Focusing beyond the diffraction limit with far-field time reversal", Science, vol. 315:1120-1122, Feb. 2007.
Lienard, M. et al., "Focusing gain model of time-reversed signals in dense multipath channels," IEEE Antennas and Wireless Propagation Letters, vol. 11:1064-1067, 2012.
Ma, H. et al., "Interference-Mitigating Broadband Secondary User Downlink System: A Time-Reversal Solution", Global Telecommunications Conference, pp. 884-889, 2013.
Montaldo, G. et al., "Telecommunication in a disordered environment with iterative time reversal", Waves Random Media, vol. 14:287-302, 2004.
Moura, J.M.F. and Y. Jin, "Detection by Time Reversal: Single Antenna", IEEE Trans. On Signal Process., vol. 55(1):187-201, Jan. 2007.
Moura, J.M.F. and Y. Jin, "Time Reversal Imaging by Adaptive Interference Canceling", IEEE Trans. On Signal Process., vol. 56(1):233-247, Jan. 2008.
Naqvi, I.H., et al., "Performance Enhancement of Multiuser Time Reversal UWB Communication System", Proc. of IEEE ISWCS, pp. 567-571, 2007.
Naqvi, I.H. et al., "Experimental validation of time reversal ultra wide-band communication system for high data rates", IET Microw. Antennas Propag., vol. 4(Iss.5):643-650, 2010.
Naqvi, I.H. et al., "Effects of Time Variant Channel on a Time Reversal UWB System", Global Telecommunications Conference, 2009.
Nguyen, H. T., "On the performance of one bit time reversal for multi-user wireless communications", IEEE Proc. of ISWCS, pp. 672-676, 2007.
Nguyen, H. et al., "Antenna Selection for Time Reversal MIMO UWB Systems", IEEE Vehicle Technology Conference, pp. 1-5, 2009.
Nguyen, H. et al. "On the MSI Mitigation for MIMO UWB Time Reversal Systems", Proc. of IEEE International Conference on Ultra-Wideband, pp. 295-299, 2009.
Nguyen, H. et al., "Preequalizer Design for Spatial Multiplexing SIMO-UWB TR Systems", IEEE Trans. On Vehicular Tech., vol. 59(8):3798-3805, Oct. 2010.
Nguyen, H.T., "Partial one bit time reversal for UWB impulse radio multi-user communications", IEEE Proc. of ICCE, 2008.
Nguyen, H.T., Kovacs, I.Z., Eggers, P.C.F., "A time reversal transmission approach for multiuser UWB communications", IEEE Trans. Antennas and Propagation, vol. 54(11):3216-3224, Nov. 2006.
Nguyen, T.K., H. Nguyen, F. Zheng and T. Kaiser, "Spatial Correlation in SM-MIMO-UWB Systems Using a Pre-Equalizer and Pre-Rake Filter", Proc. of IEEE International Conference on Ultra-Wideband, pp. 1-4, 2010.
Nguyen, T.K., H. Nguyen, F. Zheng, and T. Kaiser, "Spatial Correlation in the Broadcast MU-MIMO UWB System Using a Pre-Equalizer and Time Reversal Pre-Filter", Proc. of IEEE ICPCS, 2010.
Oestges, C., A.D. Kim, G. Papanicolaou, and A.J. Paulraj, "Characterization of Space-Time Focusing in Time Reversed Random Fields", IEEE Trans. Antennas and Propag., pp. 1-9, 2005.
Parvulescu, A. and Clay, C. S., "Reproducibility of Signal Transmissions in the Ocean", The Radio and Electronic Engineer, pp. 223-228, Apr. 1965.

(56) References Cited

OTHER PUBLICATIONS

Phan-Huy, D. T., S.B. Halima, M. Helard, "Frequency Division Duplex Time Reversal", Global Telecommunications Conference, (2011).
Pitarokoilis, A., Mohammed, S. K., Larsson, E.G., "Uplink performance of time-reversal MRC in massive MIMO systems subject to phase noise", IEEE Trans. Wireless Communications, pp. 711-723, Sep. 2014.
Porcino, D., "Ultra-Wideband Radio Technology: Potential and Challenges Ahead", IEEE Communications Mag., pp. 66-74, Jul. 2003.
Prada, C., F. Wu, and M. Fink, "The iterative time reversal mirror: A solution to self-focusing in the pulse echo mode," J. Acoustic Society of America, vol. 90, pp. 1119-1129, 1991.
Price, R., "A Communication Technique for Multipath Channels", Proceeding of the IRE, pp. 555-570, 1958.
Qiu, R. C. et al., "Time reversal with miso for ultra-wideband communications: Experimental results," IEEE Antenna and Wireless Propagation Letters, vol. 5:269-273 (2006).
Rode, J. P., M.J. Hsu, D. Smith and A. Hussain, "Collaborative Beamfocusing Radio (COBRA)", Proc. of SPIE, vol. 8753, pp. 87530J-1-11, 2013.
Rouseff, D., D.R. Jackson, W.L.J. Fox, C.D. Jones, J.A. Ritcey, and D.R. Dowling, "Underwater Acoustic Communication by Passive-Phase Conjugation: Theory and Experimental Results", IEEE J. Oceanic Eng., vol. 26, No. 4, pp. 821-831, Oct. 2001.
Saghir, H., M. Heddebaut, F. Elbahhar, A. Rivenq, J.M. Rouvaen, "Time-Reversal UWB Wireless Communication-Based Train Control in Tunnel", J. of Comm., vol. 4, No. 4, pp. 248-256, May 2009.
Song, H. C., W.A. Kuperman, W.S. Hodgkiss, T. Akal, and C. Ferla, "Iterative time reversal on the ocean", J. Acoust. Soc. Am, vol. 105, No. 6, pp. 3176-3184, Jun. 1999.
Song, H. C., W.S. Hodgkiss, W.A. Kuperman, T. Akal, and M. Stevenson, "Multiuser Communications Using Passive Time Reversal", IEEE J. Oceanic Eng., vol. 32, No. 4, pp. 915-926, Oct. 2007.
Strohmer, T., M. Emami, J. Hansen, G. Papanicolaou and A.J. Paulraj, "Application of Time-Reversal with MMSE Equalizer to UWB Communications", Global Telecommunications Conference, pp. 3123-3127, (2004).
Viteri-Mera, C. A., Teixeira, F. L., "Interference-Nulling Time-Reversal Beamforming for mm-Wave Massive MIMO in Multi-User Frequency-Selective Indoor Channels", Jun. 18, 2015.
Wang, B. et al., "Green wireless communications: A time-reversal paradigm," IEEE Journal of Selected Areas in Communications, vol. 29:1698-1710 (2011).
Wu, F., J.L. Thomas, and M. Fink, "Time Reversal of Ultrasonic Fields-Part II: Experimental Results", IEEE Trans. Ultrasonics, Ferroelectrics and Freq. Contr., vol. 39(5):567-578, Sep. 1992.
Wu, Z.H., Han, Y., Chen, Y., and Liu, K.J.R., "A Time-Reversal Paradigm for Indoor Positioning System", IEEE Transactions on Vehicular Technology, vol. 64(4):1331-1339, special section on Indoor localization, tracking, and mapping with heterogeneous technologies, Apr. 2015.
Xiao, S. Q., J. Chen, B.Z. Wang, and X.F. Liu, "A Numerical Study on Time-Reversal Electromagnetic Wave for Indoor Ultra-Wideband Signal Transmission", Progress in Electromagnetics Research, PIER 77, pp. 329-342, 2007.
Yang, Y. H., "Waveform Design and Network Selection in Wideband Small Cell Networks", University of Maryland Ph. D. Thesis, 2013.
Yang, Y. H., B. Wang and K.J.R. Liu, "Waveform Design for Sum Rate Optimization in Time-Reversal Multiuser Downlink Systems", Global Telecommunications Conference, (2011).
Yang, Y.-H., Wang, B., Lin, W.S., Liu, K.J.R., "Near-Optimal Waveform Design for Sum Rate Optimization in Time-Reversal Multiuser Downlink Systems", IEEE Trans Wireless Communications, vol. 12(1):346-357, Jan. 2013.
Zhou, X., P.C.F. Eggers, P. Kyritsi, J.B. Andersen, G.F. Pedersen and J.O. Nilsen, "Spatial Focusing and Interference Reduction using MISO Time Reversal in an Indoor Application", IEEE Proc. of SSP, pp. 307-311, 2007.

\* cited by examiner

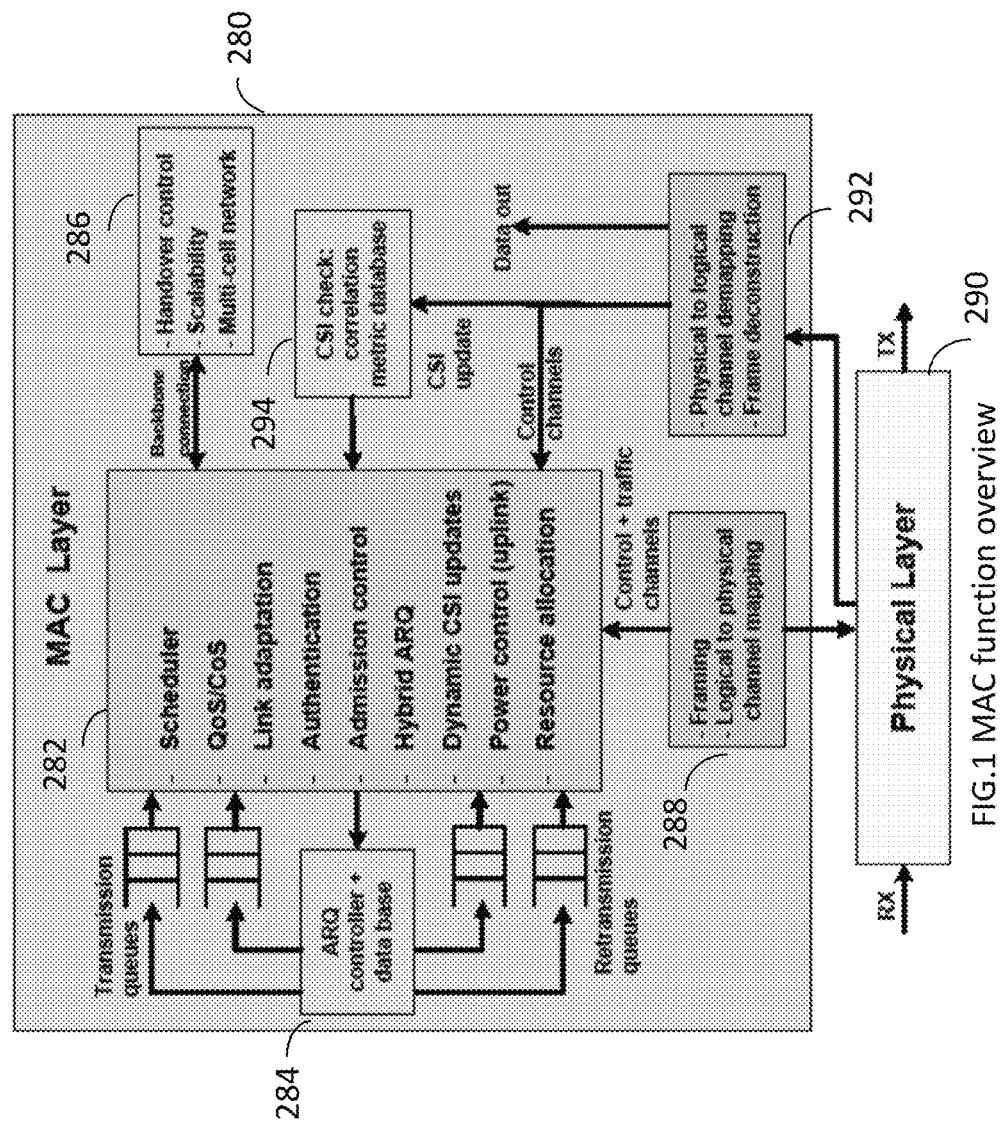
FIG.1 MAC function overview

Centralized Protocol

Distributed Protocol

| Algorithm 1 Centralized Network Association Protocol |
|---|
| 1: /**** Channel Probing Phase ****/ |
| 2: The new arrival UE $j$ broadcasts an impulse signal. |
| 3: The BSs calculate the CSI and estimate the distance according to the signal strength. |
| 4: /**** BS Association Phase ****/ |
| 5: All the BSs report the distance and load information to the central server. |
| 6: The server calculates the parameters $\xi_1, \xi_2, \xi_3$ using (7a-7c) for TR wideband systems or using (9) for massive MIMO systems. |
| 7: The server compares the overall expected throughput using (14), decides an optimal BS for the new UE, and then notifies the optimal BS. |
| 8: The optimal BS sends a synchronization signal to the new UE to establish connection. |
| 9: /**** BS Association Phase ****/ |
| 10: The optimal BS transmits data to the associated UEs concurrently. |

FIG. 3 Centralized Network Association Protocol

Algorithm 2 Distributed Network Association Protocol

1: /** BS Association Phase **/
2: The BS broadcasts the beacon signal with load status.
3: The new arrival UE detects the beacon signals and estimates the distance to the BSs.
4: The new UE calculates a priority list of BSs according to (16).
5: The new UE sequentially sends a request to the BSs on the list until a confirmation is received.
6: The BS decides whether to send a confirmation to the new UE according to the constraints in (16).
7: /** Channel probing phase **/
8: The new UE sends an impulse signal to the confirmed BS.
9: The confirmed BS records the CSI and utilizes it for waveform or beamforming design.
10: /** Data transmission phase **/
11: The optimal BS transmits data to the associated UEs concurrently.

FIG. 4 Distributed Network Association Protocol

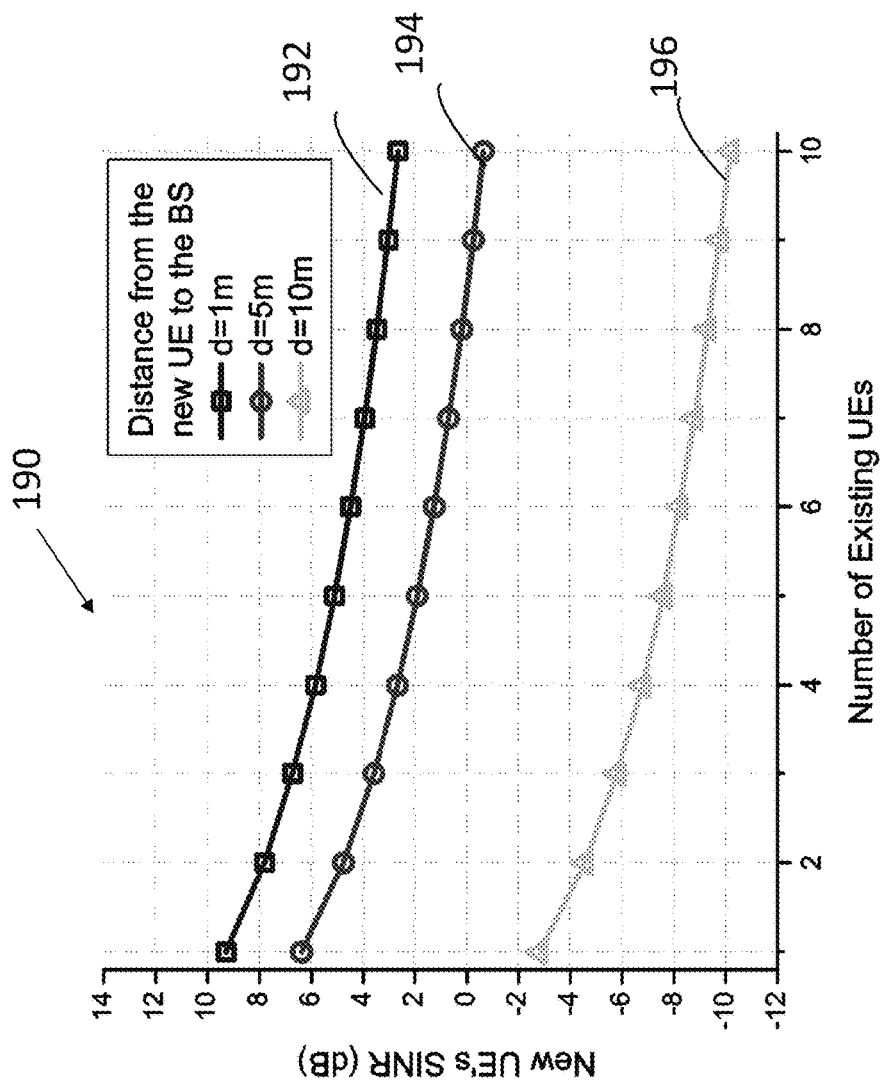
FIG. 5 SINR performance of the new UE, TR system

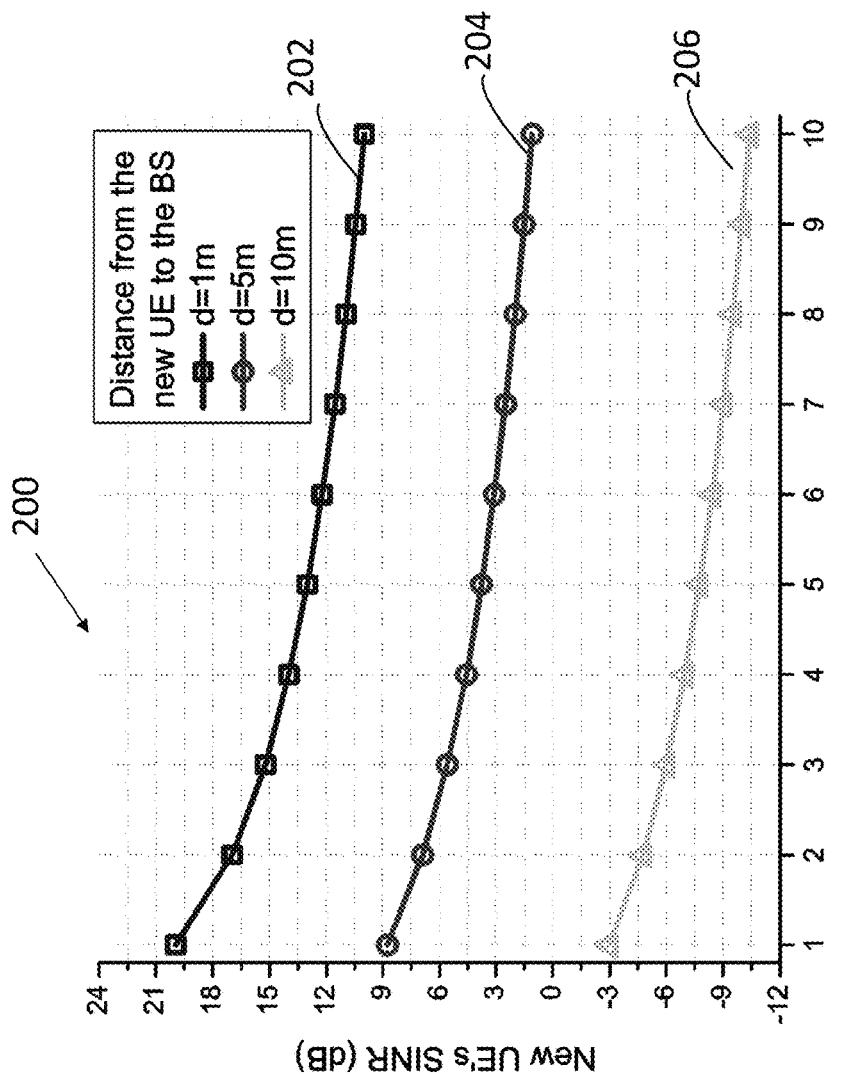
FIG. 6 SINR performance of the new UE, MMIMO system

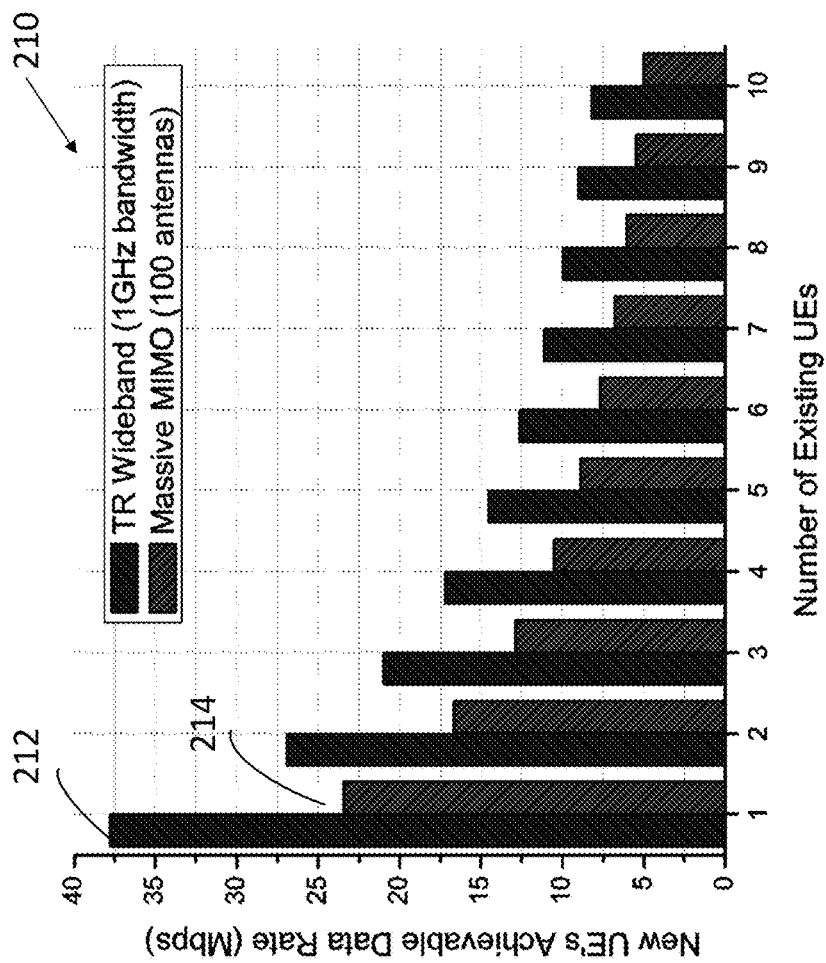
FIG. 7 Achievable Data Rate of the new UE in both systems

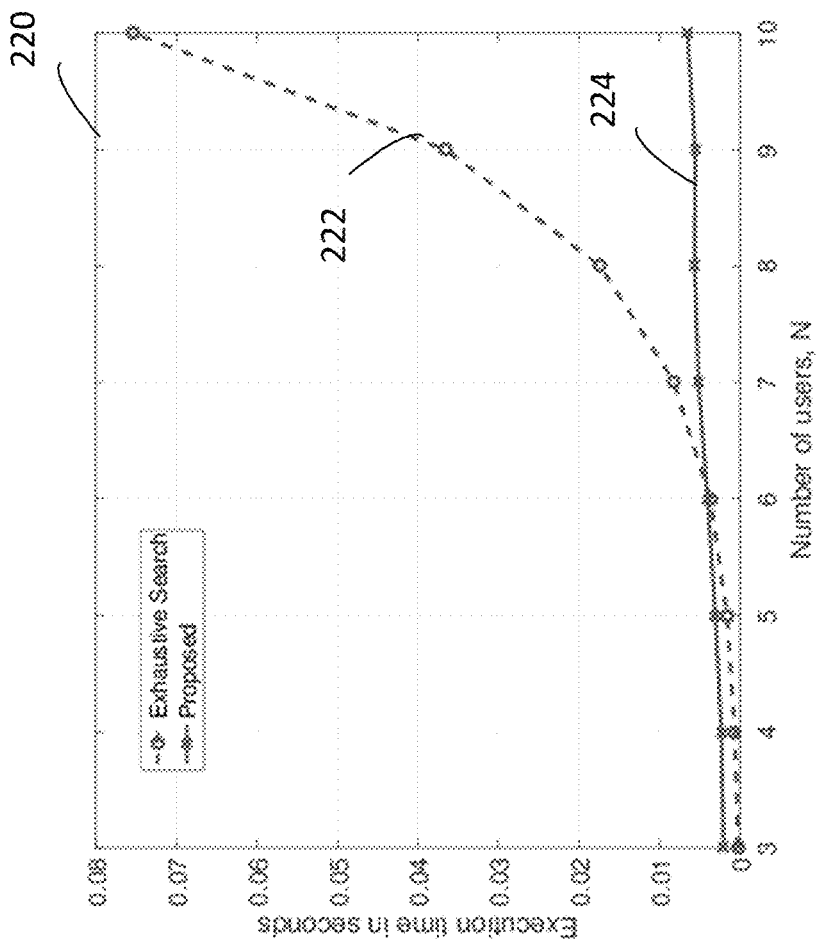
FIG. 8 Complexity comparison between exhaustive search and the MIQCQP scheduler.

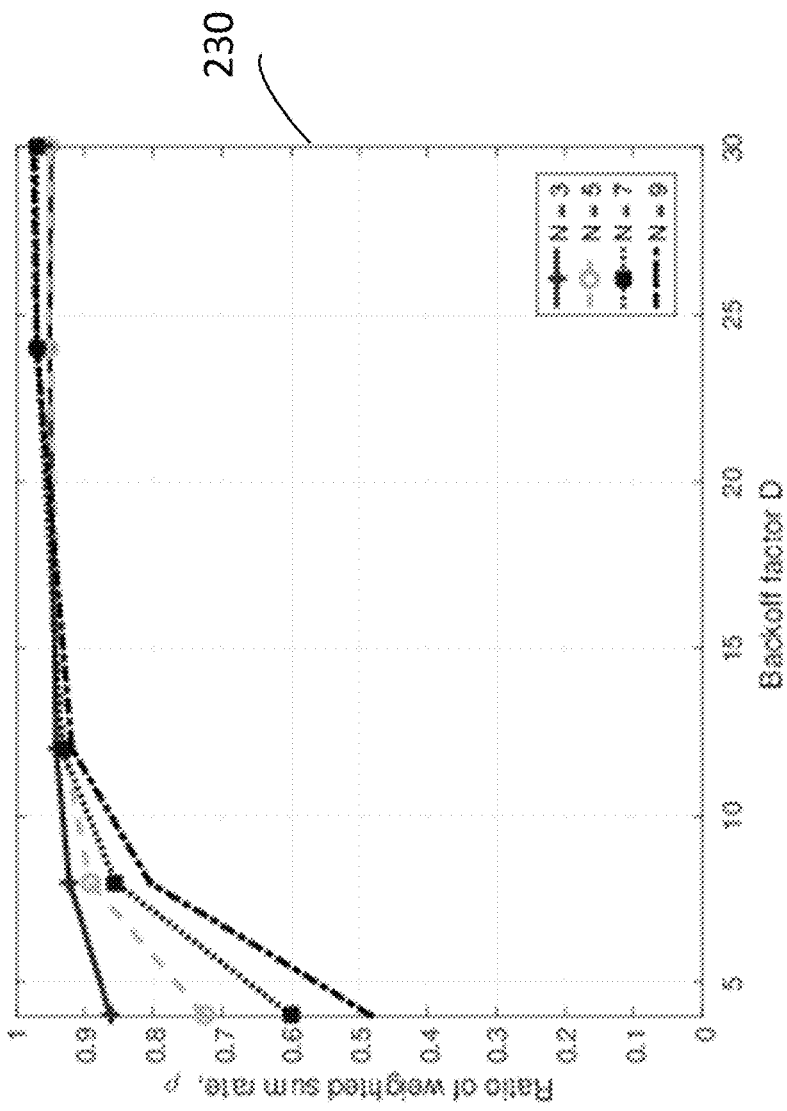
FIG. 9A Performance of the proposed scheduler compared with exhaustive search result, TR system.

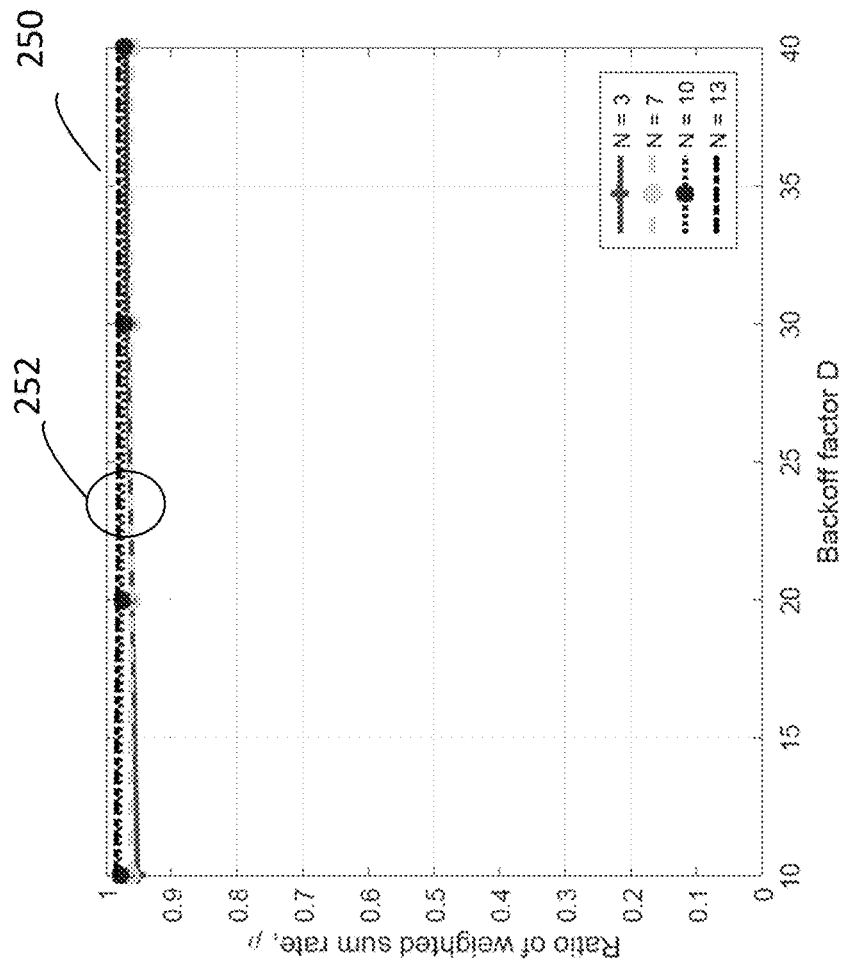
FIG. 10 Performance of the proposed scheduler compared with exhaustive search result, MMIMO system.

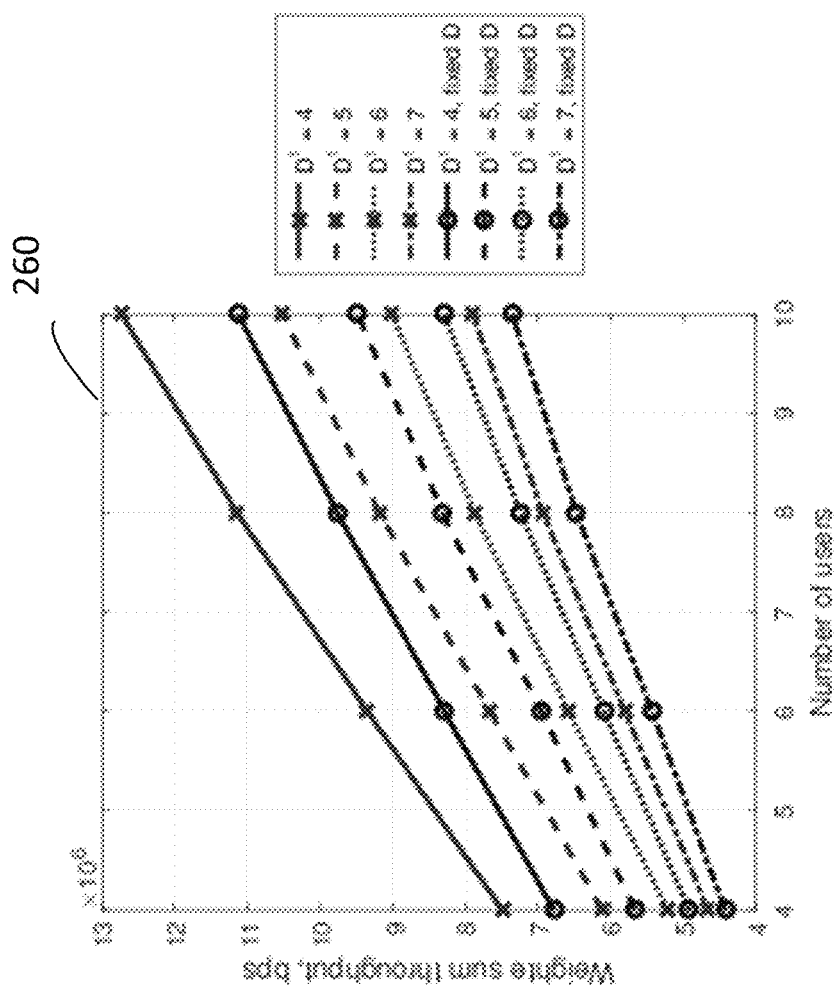
FIG. 11 Throughput comparison with the proposed algorithm and fixed $D^1$, $M = 2$, $k = 4$

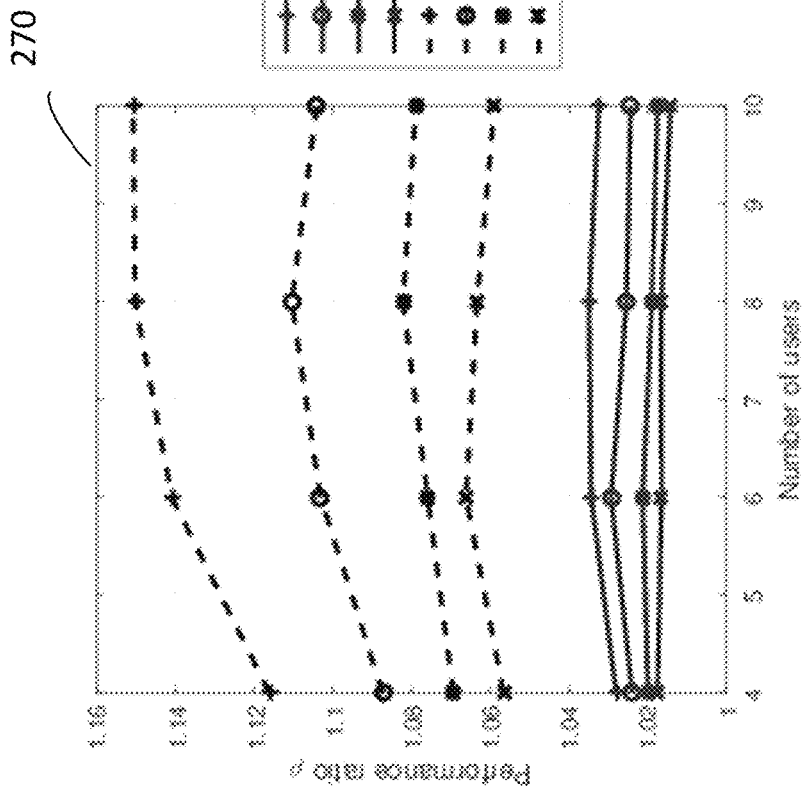
FIG. 12 Performance, $\rho = R_{MIQCQP}/R_{fixed}$, comparison with different $k$, $M = 2$

METHODS, DEVICES, APPARATUS, AND SYSTEMS FOR MEDIUM ACCESS CONTROL IN WIRELESS COMMUNICATION SYSTEMS UTILIZING SPATIAL FOCUSING EFFECT

CROSS-REFERENCE TO RELATED APPLICATIONS

This application claims priority to U.S. patent application 62/295,970, filed on Feb. 16, 2016, entitled "The Impact of Spatial Focusing Effects on Medium Access Control Design for 5G," and U.S. patent application 62/320,965, filed on Apr. 11, 2016, entitled "Optimal Rate Adaptation for Throughput Maximization in Time Reversal Divisional Multiple Access." The contents of the above applications are incorporated herein by reference in their entireties.

TECHNICAL FIELD

This present invention generally relates to wireless communication systems that employ transmission and reception methods that take advantage of focusing received signal energy in space and/or time. More specifically, the present invention relates to medium access control (MAC) techniques, methods, and protocols that can be used to coordinate the signal transmission and reception of multiple users.

BACKGROUND

A time-reversal (TR) communication system can include of multiple wireless devices that employ the TR principle to communicate with each other. One device, device A, the intended receiver of a data frame, first transmits a predefined channel probing signal (e.g., a pulse or a special code sequence) to another device, device B, the device that intends to send the data frame. As the channel probing signal propagates through the wireless channel, the channel probing signal is convolved with the channel's impulse response. Device B receives the channel probing signal and computes a location-specific signature waveform based on the received channel probing signal. In some implementations of a TR system, the location-specific signature waveform will be the time-reversed and conjugated version of the channel's impulse response, but other types of location-specific signature waveforms may also be computed. When sending the data frame to device A, device B convolves its data signal with the location-specific signature waveform and sends the resulting signal to device A. Device A then receives the transmitted signal and demodulates and decodes the data frame. Each of devices A and B can transmit and receive wireless signals. Each of devices A and B has transmitter circuit for transmitting signals and a receiver circuit for receiving signals. The transmitter circuit includes a transmitter antenna and a radio frequency chain for processing signals to be transmitted. The receiver circuit includes a receiver antenna and a radio frequency chain for processing received signals. The transmitter antenna and the receiver antenna can be the same antenna, or be different antennas. The transmitter circuit and the receiver circuit are referred to as "transceivers."

If the above transmission principle is used, the wireless channel acts as a natural matched filter, creating an energy peak at device A's location. Since the transmitted signal was computed based on the wireless channel between device A and device B, this energy peak will only appear at the location of device A (and the nearby vicinity). At all other locations, only a small fraction of the transmitted energy will be received. This is the spatial focusing effect, in which constructive interference of the transmitted signal occurs only at the intended receiver's location, and the transmitted signal strength decreases significantly at other locations that are a few wavelengths away from the intended receiver's location.

The benefits of the spatial focusing effect are manifold. First, because the signal is concentrated at the intended location, the inter-user interference (IUI) can be significantly reduced, and simultaneous transmission to multiple users over the same frequency band becomes possible since users are naturally separated by their locations. Moreover, the energy concentration can also lead to better energy efficiency and enhanced physical layer security.

Even though the principles of TR communications were described using a unicast (point-to-point) transmission example between device A and device B, TR is not limited to unicast communications. It can be used for broadcast and multi-cast (point-to-multipoint) communication as well.

Massive multiple-input multiple-output (MMIMO) wireless communication systems can also achieve spatial concentration of the transmitted signal energy. The MMIMO systems employ a large number (several hundreds) of transmit and/or receive antennas and create high-dimensional quasi-orthogonal overall channel impulse responses for different receiver locations, focusing the energy of the transmitted signal at the desired receiver device's location. The benefits of MMIMO spatial focusing can be similar to those of the TR approach.

MAC design defines the transmission protocol over a shared medium and an efficient MAC protocol can optimally distribute the shared system resources to different users, coordinate their transmission, and provide QoS guarantee. Because of the unique spatial focusing effect, conventional MAC designs may no longer be efficient in MMIMO and TR systems.

SUMMARY

This invention relates to wireless systems that employ transmission and reception methods that take advantage of focusing the received signal energy in space and/or time. This document describes a number of medium access control (MAC) techniques and protocols that can be used to coordinate the signal transmission and reception of multiple users in such systems to reduce the inter-user interference, and improve the efficiency and the experienced quality of service (QoS) in the wireless network. In particular, this invention considers MAC design for two such transmission schemes: the time-reversal (TR) communication system and the massive multiple input multiple output (MMIMO) communication system.

This document describes techniques, methods and protocols for communication between two or more wireless devices equipped with one or more antennas. These devices communicate with each other by sending and receiving radio-frequency (RF) signals using their antennas over the wireless transmission medium. Some of the devices may be pre-deployed devices with the responsibility of controlling wireless traffic and collecting/redistributing data in/near a certain physical location. These devices may be referred to as a base station (BS), an access point (AP), a router, and the like. Some other devices may be the end systems used by human users to access the wireless services. These devices may be referred to as a user, a user equipment (UE), a terminal device (TD), a mobile device, a phone, a computer, a tablet, a wearable electronic device such as a watch, and the like. All of these devices may act as transmitters and/or receivers in the wireless system.

In a general aspect, a base station of a time reversal communication system is provided. The base station includes at least one transceiver; at least one processor; and a memory communicatively coupled with the at least one processor, the memory storing a set of instructions to be executed by the at least one processor. The set of instructions cause the at least one processor to receive a set of channel probing signals from a set of terminal devices through a set of wireless multipath channels to the base station, determine channel impulse responses for the set of multipath channels associated with the set of terminal devices, and determine location-specific signature waveforms based on the channel impulse responses for the set of multipath channels associated with the set of terminal devices, in which each of the location-specific signature waveforms is associated with a particular location of the respective terminal device and is based on a time-reversed waveform of the corresponding channel impulse response. The set of instructions cause the at least one processor to generate a set of medium access layer parameters, in which each of the set of medium access layer parameters is associated with a particular one of the set of terminal devices. The set of instructions cause the at least one processor to generate, for each particular terminal device, transmit data signals based on data intended for the particular terminal device, the particular medium access layer parameter, and the particular location-specific signature waveform. The transceiver transmits the transmit data signals wirelessly to the terminal devices.

In another general aspect, a set of base stations of a time reversal communication system is provided. Each base station includes a network port for connecting to a network, in which the network includes a server. The base station includes a transceiver to receive at least one channel probing signal from a set of terminal devices that intend to communicate with the base station, and a data processor. The data processor is configured to, for each of the terminal devices that intend to communicate with the base station, determine a metric based on the received at least one channel probing signal from the terminal device, wherein the base station sends the metric and current load information to the server, and wherein the server calculates an association indicator indicating whether the terminal device can be associated with the base station based on at least one of the metric or the load information. For each of the terminal devices that can be associated with the base station, the data processor is configured to determine a signature waveform based on a time-reversed waveform of a channel response signal derived from the corresponding received at least one channel probing signal from the terminal device, and determine a respective downlink transmit signal for the respective terminal device based on respective downlink data and the respective signature waveform. The transceiver includes an output module to transmit respective downlink signal to respective terminal device.

In another general aspect, a set of base stations of a time reversal communication system is provided. Each base station includes a network port for connecting to a network, a transceiver to broadcast at least one of a beacon signal or a current load information to a set of terminal devices that intend to communicate with the base station, wherein each of the set of terminal devices determines a metric based on at least one of the received beacon signal or the current load information, determines a priority list of the set of base stations based on the metric, and sends a request to each of the set of base stations according to the priority list. Each base station includes a data processor configured to, for each of the terminal devices that sends the request, determine an association indicator representing whether the terminal device can be associated with the base station device. The data processor is configured to, for each of the terminal devices that can be associated with the base station device, determine a signature waveform based on a time-reversed waveform of a channel response signal derived from at least one channel probing signal that is sent from the terminal device, and determine a respective downlink transmit signal for the respective terminal device based on the respective downlink data and the respective signature waveform. The base station includes an output module to transmit respective downlink signal to respective terminal device.

BRIEF DESCRIPTION OF DRAWINGS

FIG. 1 shows an exemplary diagram of MAC function overview.

FIG. 3 shows an exemplary algorithm for a centralized network association protocol.

FIG. 4 shows an exemplary algorithm for a distributed network association protocol.

FIG. 5 shows an exemplary graph showing the signal-to-interference-plus-noise ratio (SINR) performance of the new UE when joining a base station in the TR system.

FIG. 6 shows an exemplary graph showing the SINR performance of the new UE when joining a base station in the MMIMO system.

FIG. 7 shows an exemplary graph showing the achievable data rate of the new UE in both TR and MMIMO systems.

FIG. 8 shows an exemplary graph showing the complexity comparison between exhaustive search and a mixed integer quadratic constraint quadratic programming (MIQCQP) scheduler.

FIG. 9A shows an exemplary graph showing the performance of the scheduler of the present invention compared with exhaustive search result in the TR system, with different numbers of users.

FIG. 10 shows an exemplary graph showing the performance of the scheduler of the present invention compared with exhaustive search result in the MMIMO system.

FIG. 11 shows an exemplary graph showing the throughput comparison with the rate adaptation algorithm of the present invention with fixed $D^1$, M=2, k=4.

FIG. 12 shows an exemplary graph showing the throughput comparison $\rho=R_{MIQCQP}/R_{fixed}$, with different k, M=2.

DETAILED DESCRIPTION

This document describes medium access control techniques for wireless systems that employ transmission and reception methods that take advantage of focusing the received signal energy in space and/or time. Novel medium access control techniques and protocols are provided to coordinate the signal transmission and reception of multiple users in the wireless systems to reduce inter-user interference and improve the efficiency and the experienced quality of service for the users of the wireless systems. This document describes a first medium access control design for time-reversal communication systems, and a second medium access control design for massive multiple input multiple output communication systems.

In the following, we briefly explain the Open Systems Interconnection model (OSI model) as defined in ISO/IED 7498-1, and the functions provided by the medium access control layer. The OSI model characterizes and standardizes the communication functions of a telecommunication system without regard to their underlying internal structure and technology. The model partitions a communication system into abstraction layers, including physical layer, data link layer, network layer, transport layer, session layer, presentation layer, and application layer. The data link layer includes two sublayers: the logical link control layer and the media access control layer. The media access control layer is responsible for controlling how devices in a network gain access to resources in the wireless system.

In some implementations, a base station communicates with multiple user equipment (UE) devices. The following describes the medium access control layer for the base station and the UE devices.

Figure 15:
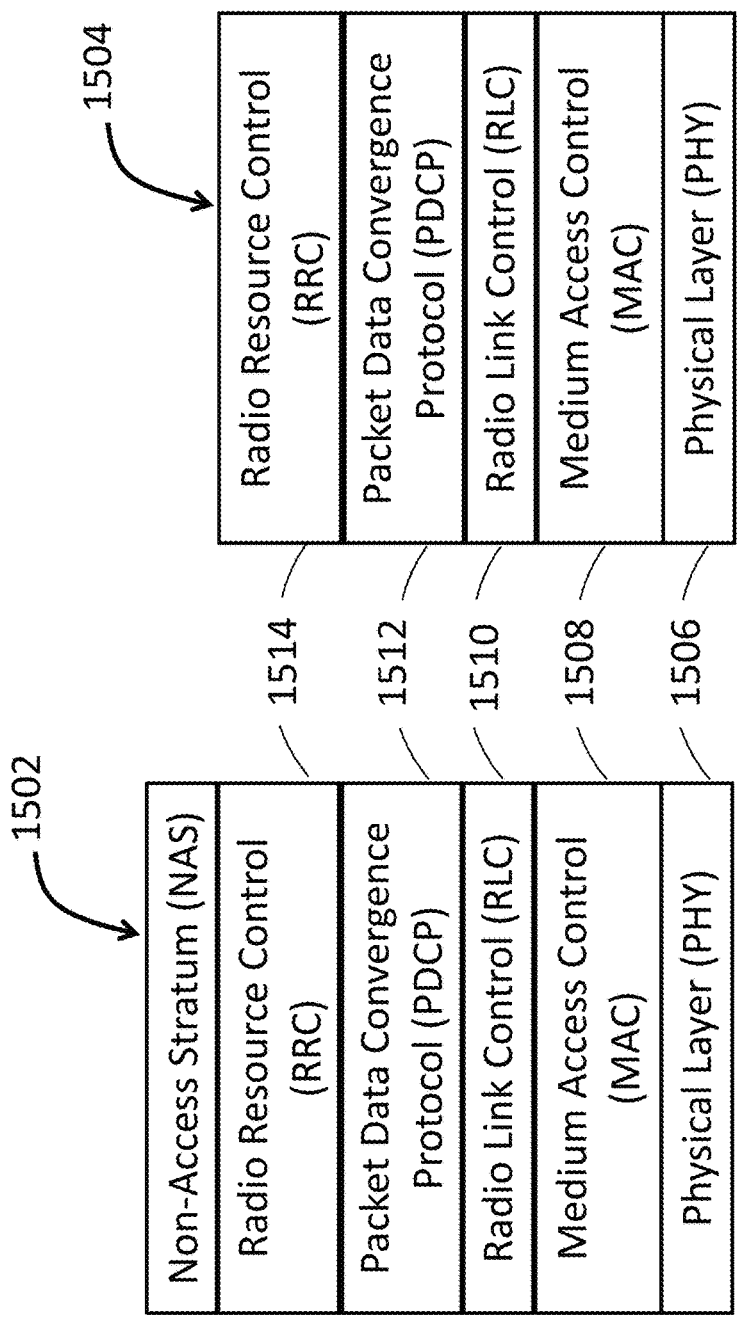
FIG. 15 shows exemplary protocol stacks.

FIG. 15 shows an exemplary protocol stack 1502 for the UE and an exemplary protocol stack 1504 for the base station. The protocol stacks 1502 and 1504 include a physical layer protocol 1506 that is defined for the user and the base station to transfer data over the radio link. A medium access control (MAC) protocol 1508 is defined to handle retransmission, random access, feedback and the mapping between physical layer channels and medium access control layer channels. A radio link control protocol 1510 is defined to provide segmentation, re-assembly and concatenation of the packets, duplicate detection, and re-transmission. A packet data convergence protocol 1512 provides protocol transparency for higher layer protocols, and performs protocol control information compression. A radio resource control protocol 1514 is defined to handle establishment, release, and configuration of radio resources.

The present invention provides a novel design for the MAC layer. The MAC layer functions generally include mapping between transport and logical channels, error correction through hybrid automatic repeat request (HARQ), priority handling with dynamic scheduling, and logical channel prioritization. FIG. 1 is a diagram showing major functions of a MAC layer 280. Module 282 includes many of the functions of the MAC layer. In some implementations, the MAC layer 280 provides a scheduler that determines the order of user/packet transmission such as which set of users can transmit simultaneously and/or in what order the users should transmit, to ensure quality of service (QoS) or class of service (CoS). The MAC layer 280 provides the function of link adaptation, which refers to the matching of the modulation, code/coding, and other signal and protocol parameters to the conditions on the radio link. The MAC layer 280 provides the function of authentication, which refers to the process that allows an authorized user to access a network to ensure network security. The MAC layer 280 provides the function of resource allocation that optimizes the resources that are allocated to each of the users, such as frequency/spectrum allocation, time slot allocation, code allocation, and power allocation.

The MAC layer 280 provides the function of admission control, which is a validation process in which a check is performed before a connection is established to determine whether current resources are sufficient for the proposed connection. Because the distances from each of the users to the base station are different, the received power from each user at the base station can vary significantly, leading to uneven signal-to-interference-plus-noise ratios (SINRs) for different users. The MAC layer 280 provides power control (uplink), which refers to the process that adjusts the transmit power of each user so that the received power and thus the SINR of the transmitting users are roughly at the same level. The MAC layer 280 provides the function of dynamic channel state information (CSI) updates, which can either occur periodically or be triggered by some event, for example, when the packet failure rate is greater than some threshold.

The MAC layer 280 provides Hybrid ARQ (HARQ) function, which controls the order/priority in transmitting one user's packets in the transmission queue and retransmission queue. The output data from the processes occurring in module 282 can feed into a database in an ARQ controller. The ARQ controller and the database are collectively represented by a module 284. The output of the module 282 can be provided to a module 286, which include processes for handling handover control, scalability, and multi-cell network. This is useful in situations in which multiple base stations (or cells) form a multi-cell network through backbone connections. For example, the MAC layer 280 determines whether or how to hand over a user from one cell to another, and which cell to join when a user becomes active. The MAC layer 280 also interacts with a physical layer 290. For example, the MAC layer 280 includes a module 288 that determines how to construct a frame and how to map the logical channels to the physical channels, and a module 292 that performs the physical to logical channel demapping and obtains a correct frame according to a frame structure. The MAC layer 280 includes a module 294 that performs channel state information (CSI) check. The module 294 includes a correlation metric database, which stores time reversal resonating strength, or equivalently, the correlation between two CSIs. The CSI is a type of physical layer information. In a multipath-rich environment, if the correlation between consecutive CSI measurements are lower than some threshold, it indicates that the channels are changing and thus there is a need to update the CSI.

Establishing the connection with a base station (BS) is the first step when a user intends to access a wireless cellular network. Upon power up or loss of service, the user searches for potential signals on each predetermined frequency band and, if a signal is found, performs system acquisition by listening to the channel that contains system information and synchronization signals. After obtaining a list of available surrounding BSs, the user or the network needs to select a suitable one with which to associate. The user-BS association is a fundamental medium access issue, and in case of TR or MMIMO systems, the unique characteristics of the spatial focusing effect should be considered.

After the initial connection is established, the user can send pilot signals to the BS which then estimates the uplink channel state information (CSI). Because the complexity of channel estimation and the overhead of sending the downlink channel estimation back to the BS is proportional to the number of antennas/multi-paths, it may not be practical for the user to estimate the downlink channel in both the MMIMO and TR wideband systems. Therefore, in some implementations, the uplink CSI is also used for assisting downlink operation, by assuming time division duplex (TDD) mode and channel reciprocity. The users within one cell should send orthogonal pilot sequences for channel estimation. However, if there are more users than the maximum number of orthogonal pilot sequences, the BS can select an optimal subset of users to transmit pilots in each channel estimation interval.

CSI updates are necessary when there is environmental change, and can be performed by the system periodically or on-demand. Periodic CSI updates can reduce signaling overhead, where the period is pre-configured according to empirical measurements on channel characteristics in a similar environment. Due to environmental changes, the system may need to adjust the frequency of channel updates by use of an on-demand re-probing process, which is triggered by the measurement on the channel quality, e.g., packet failure rate. Because of the spatial focusing effect in which the signal is only focused at a specific location, the overhead of CSI updates in a high-mobility environment may be high. In some implementations, a meaningful way to guarantee reliable communication while avoiding too frequent CSI updates is to design robust beamforming or waveform design to make the region where the signal is focused to be bigger along the path of a mobile user. For example, the mobile user quickly moves along a straight line from location A to location A' while receiving information symbols from a base station. The conventional beamforming or waveform design may only maximize the received SINR at each point along the path between location A to location A', which requires accurate CSI measurements at each of the points and thus incurs a considerable amount of overhead. Because a higher SINR indicates a sharper focusing beam at the mobile user, if we slightly "relax" the beam so that the beam becomes wider and covers a larger region, when the user moves to nearby locations it will also receive the information transmitted from the base station, although at a lower SINR.

After acquiring the CSI, the MAC layer can use such information to coordinate multiple users' transmission through resource allocation and scheduler design. Although in MMIMO or TR wideband communications, the channels to different users become quasi-orthogonal as the number of antennas or multipaths increases, it only holds in a statistical sense and the quasi-orthogonality is an asymptotic limiting behavior. For short periods of time there may still exist certain interferences since the channels to different users may still be correlated. As the number of users increases, interference management becomes even more important. Meanwhile, different classes of services (CoS) impose more heterogeneous requirements on the QoS. Therefore, it is useful to design an efficient scheduler that can maximize the resource utilization by alleviating mutual interference while maintaining satisfactory QoS for each active user.

The performance of both the TR and MMIMO systems is determined by the accuracy of the CSI, which can be degraded by the pilot contamination due to the limited number of orthogonal pilot sequences in a multi-cell system. Various approaches have been considered to alleviate the pilot contamination such as optimizing the allocation of pilot waveforms, improving the channel estimation algorithm, and designing new precoding techniques. If multiple BSs are able to collaborate through a backhaul connection, then a more straightforward way is to let the users in different cells transmit the pilot signals in a time division multiplexing (TDM) fashion.

Due to the spatial focusing effect, the handover control may need to be redefined in TR and MMIMO systems. MMIMO systems can steer the weight on each antenna (the weight on each antenna forms a beamforming vector and the transmitted signal is the information symbol multiplied by the beamforming vector) to provide continuous coverage to a specific user, but the calculation of the optimal beamforming vectors is computationally demanding and the mobile user may still experience sudden QoS drop at the cell edge due to imperfect CSI estimation. In the TR system, the cell coverage can be controlled by simply adjusting the rate back-off factor besides complicated waveform design. The larger the back-off factor, the higher the focusing peak since the inter-symbol interference (ISI) and IUI is reduced. Therefore, at the cell boundary, the serving BS can gradually increase the back-off factor of the users in handover to combat the path loss and extend coverage at the cost of a lower rate. The spatial focusing effect offers the possibility of designing communication systems that are more efficient and can offer better QoS than its predecessors. However, due to the unique features of this effect, the analysis tools and solutions developed for traditional wireless systems may not be applicable.

Spectrum Sharing

One aspect of this invention provides a general spectrum sharing framework that can allow for efficient reuse of the same frequency band at different spatial locations. The spatial focusing phenomenon common in both TR and MMIMO systems creates a tunneling effect for each user at his/her own location, such that the interference among different users are rather weak. Thus, multiple users can concurrently conduct data transmission using the same transmission resource (e.g., frequency band and/or time slot) by utilizing their corresponding channel state information as a unique signature. Their different locations can effectively separate them in the spatial domain and each different location is a spatial "white space". The term "spatial white space" is used to means that, by using time-reversal, the users can share the same frequency/time resources as long as they are at different locations because the location-specific signature waveforms can nearly orthogonalize their received signals and greatly reduce the inter-user interferences. Therefore, this emerging spatial focusing effect enables us to develop a general spatial spectrum sharing scheme, which allows the reuse of the same frequency band, instead of separating users either in time domain or in the frequency domain similar to the traditional dynamic spectrum access technology. Note that the traditional so-called spatial domain dynamic spectrum access based on geo-location databases is different from the spatial spectrum sharing described in this invention. The functionality of the geo-location databases is to record the spatial white-space locations that allow secondary users to utilize without harmful interference to the primary users. In contrast, our spatial spectrum sharing means that every location can be regarded as a white space and primary/secondary users can concurrently share the entire spectrum all the time wherever they are located. The major challenge of the spatial spectrum sharing lies in the waveform design in TR or the beamforming design in MMIMO, according to some specific criteria. Wave-former or beam-former can be optimally designed to maximize/increase the users' data rates, and/or minimize/reduce the user delay, etc. An example of a location-specific signature waveform is a basic waveform or beamform, which is the simple time-reversed and conjugated version of the CSI.

The spatial focusing effect commonly exists either in wideband TR systems or in large-scale MMIMO systems. This common spatial focusing phenomenon enables us to find a general spatial spectrum sharing scheme, where multiple users can concurrently conduct data transmission upon the entire pre-allocated spectrum by utilizing their corresponding channel state information as a unique signature, i.e., their locations have ideally separated them in the spatial domain. The spatial spectrum sharing scheme is rather simple that, taking the downlink transmission for an example, all the UEs' signals can be added together and transmitted simultaneously by the BS. For TR wideband system, all UEs' signals are added together after convolving with their own signatures and the sum of the signals are transmitted simultaneously. For MMIMO systems, all UEs' signals are multiplied by the beamforming matrix and then also transmitted simultaneously. Note that the spatial and/or spectrum sharing is independent of the network operators, since every pair of transmitter and receiver receive only a small amount of interference from other wireless devices, whether the other wireless devices belong to the same operator's network or not.

User Association

Another aspect of this invention is a number of methods and protocols to create, maintain, and update associations between BSs and UEs. In order for a UE to access the services provided by the wireless network, the UE needs to be associated with at least one BS, and the serving BS(s) will extend the network's services to the UEs. In this document, we will describe two general network association protocols that work either in a centralized manner or a distributed manner. These protocols are applicable for both TR wideband systems and MMIMO systems because the SINR performance of these two systems can be formulated in a similar manner.

Figure 13:
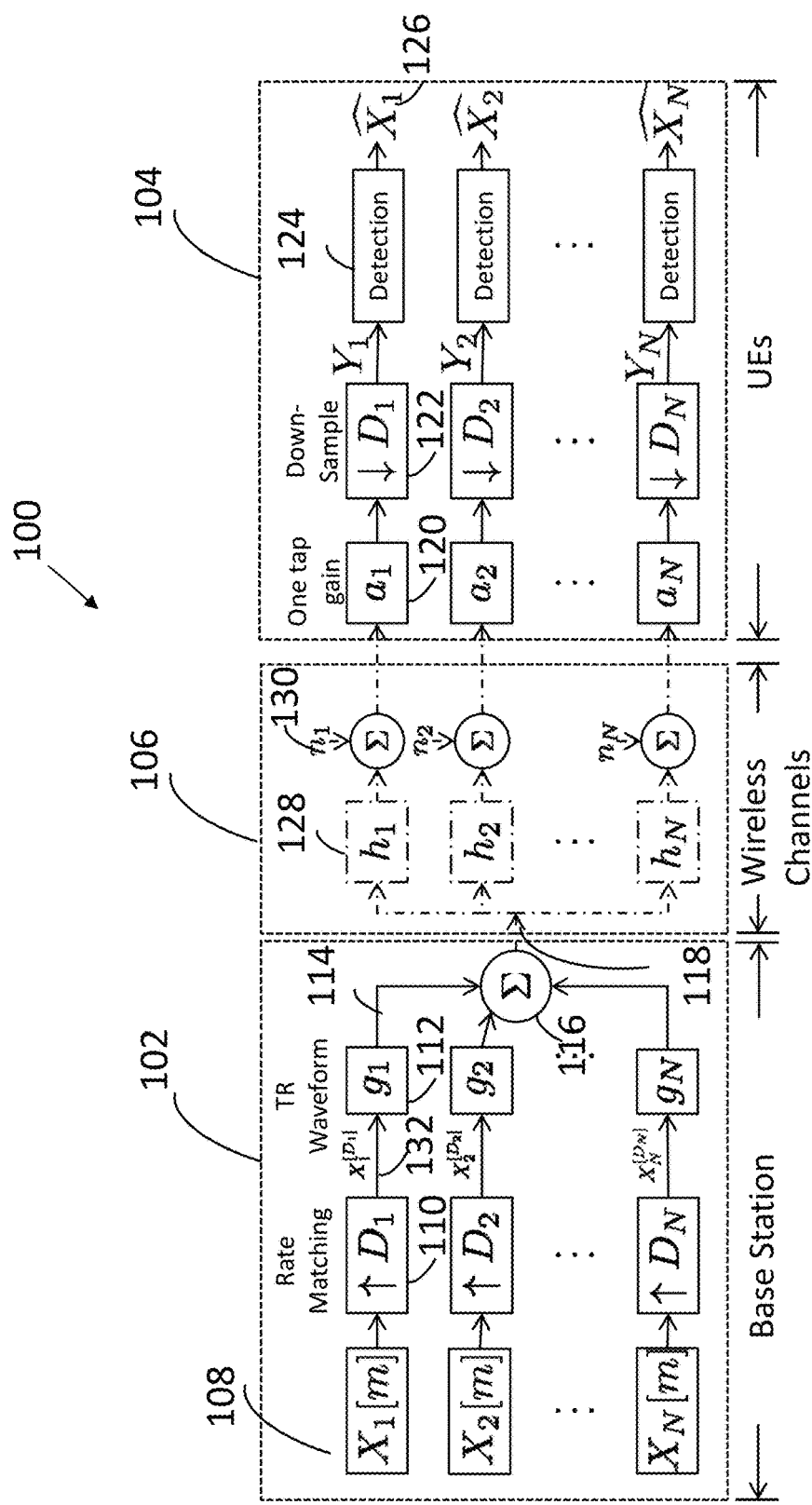
FIG. 13 shows an exemplary diagram showing the TRDMA system in downlink.

An exemplary diagram on the Time Reversal Division Multiple Access communication system 100 is shown in FIG. 13. The system 100 includes a base station 102 that communicates with user equipment devices 104 through wireless channels 106. The base station 102 includes a first up-sampling module 110 that up-samples data symbols $X_1[m]$ 108 intended for the first user equipment device according to a first rate back-off factor to generate up-sampled data symbols $X_1^{[D_1]}$. At a first signature waveform module 112, the up-sampled data symbols $X_1^{[D_1]}$ are convolved with a first signature waveform $g_1$ associated with the first user equipment device 104 to generate a first transmission waveform 114. Similarly, the base station 102 includes an i-th up-sampling module 110 that up-samples data symbols $X_i[m]$ 108 intended for the i-th user equipment device according to an i-th rate back-off factor to generate up-sampled data symbols $X_i^{[D_i]}$. Different user equipment devices may be associated with either the same rate back-off factor or different rate back-off factors. At an i-th signature waveform module 112, the up-sampled data symbols $X_i^{[D_i]}$ are convolved with an i-th signature waveform $g_i$ associated with the i-th user equipment device 104 to generate an i-th transmission waveform 114. A summation module 116 combines the transmission waveforms 114 for the first to the N-th user equipment devices 104 to generate a combined downlink signal 118. In FIG. 13, only one base station 102 is shown. The system 100 can include multiple base stations 102.

Portions of the combined downlink signal 118 travel through various wireless channels $h_i$ (i=1 to N) 128 to reach the N user equipment devices 104. Noise 130 is added to the downlink signal as the signal portions travel through the wireless channels. For the portion of the combined downlink signal that reaches the first user equipment device 104, due to the effects of the wireless channel, the main portion of the signal received at the first user equipment device 104 includes data symbols intended for the first user equipment device 104. The data symbols intended for the other user equipment devices appear as noise in the received signal. The first user equipment device 104 includes a first gain module 120 that applies a one-tap gain $\alpha_1$ to the signal received at the first user equipment device 104. A first down-sampling module 122 down-samples the received signal according to the first rate back-off factor to generate a first down-sampled signal $Y_1$. A first detection module 124 processes the first down-sampled signal $Y_1$ to generate detected data symbols $\hat{X}_1$. Similarly, the i-th user equipment device 104 includes an i-th gain module 120 that applies a one-tap gain $\alpha_i$ to the signal received at the i-th user equipment device 104. An i-th down-sampling module 122 down-samples the received signal according to the i-th rate back-off factor to generate an i-th down-sampled signal $Y_1$. An i-th detection module 124 processes the i-th down-sampled signal $Y_1$ to generate detected data symbols $\hat{X}_i$.

The channel and system model for the TR system can be described as follows. The channel between the i-th BS and the j-th UE can be modeled by the large scale fading incurred by the distance attenuation combined with the small scale fading incurred by the multi-path environment. The small scale fading, denoted by $h_{i,j}$, can be written by $$h_{i,j} = [h_{i,j}[0], h_{i,j}[1], \ldots, h_{i,j}[L-1]] \qquad (1)$$

where $h_{i,j}[k]$ represents the k-th tap of the channel impulse response (CIR) with length L and can be written by $$h_{i,j}[k] = \sum_{l=0}^{L-1} h_{i,j}^l \delta[k-l], \qquad (2)$$

with $\delta[\cdot]$ as the Dirac delta function. We consider a rich-scattering environment, in which due to the spatial heterogeneity and the rich multi-paths, the CIRs of different UEs in different locations are assumed to be uncorrelated. For the receiver side of the TR wideband system, the received signal of the j-th UE can be represented as follows $$Y_j^{[D]}[k] = \sum_{i=1}^{M} d_{i,j}^{-\alpha/2}(S_i * h_{i,j})[k] + n_j[k], \qquad (3)$$

where $d_{i,j}$ represents the distance between the i-th BS and the j-th UE, $\alpha$ is the path loss coefficient, $d_{i,j}^{-\alpha/2}$ represents the aforementioned large scale fading incurred by the distance attenuation, $h_{i,j}$ represents the small scale fading between the i-th BS and the j-th UE, $S_i$ represents the transmitted signal, and $n_j$ represents the additive white Gaussian noise with zero mean and variance $\sigma^2$.

Examples of time-reversal communication systems are described in, e.g., U.S. patent application Ser. No. 13/706,342, filed on Dec. 5, 2012, titled "Waveform Design For Time-Reversal Systems," U.S. patent application Ser. No. 13/969,271, filed on Aug. 16, 2013, titled "Time-Reversal Wireless Systems Having Asymmetric Architecture," International patent application PCT/US2014/051148, filed on Aug. 14, 2014, titled "Time-Reversal Wireless Systems Having Asymmetric Architecture," now International publication WO/2015/023895, dated Feb. 19, 2015, U.S. Pat. No. 9,559,874, titled "Multiuser Time-Reversal Division Multiple Access Uplink System With Parallel Interference Cancellation," U.S. Pat. No. 9,313,020, titled "Handshaking Protocol For Time-Reversal System," U.S. Pat. No. 9,407,306, titled "Quadrature Amplitude Modulation For Time-Reversal Systems," U.S. Pat. No. 9,226,304, titled "Time-Reversal Wireless Paradigm For Internet Of Things," U.S. patent application Ser. No. 14/615,984, filed on Feb. 6, 2015, titled "Joint Waveform Design and Interference Pre-Cancellation for Time-Reversal Systems," U.S. patent application Ser. No. 15/004,314, filed on Jan. 22, 2016, titled "Time-Reversal Technologies for Hybrid Wireless Networks," U.S. patent application Ser. No. 15/061,059, filed on Mar. 4, 2016, titled "Time-Reversal Scalability for High Network Densification," U.S. patent application Ser. No. 15/268,477, filed on Sep. 16, 2016, titled "Heterogeneous Time-Reversal Paradigm Enabling Direct Connectivity In Internet Of Things," U.S. patent application Ser. No. 15/284,496, filed on Oct. 3, 2016, titled "Time-Reversal Communication Systems," and U.S. patent application Ser. No. 15/384,217, filed on Dec. 19, 2016, titled "Method, Apparatus, Server, and Systems of Time-Reversal Technology." The entire contents of the above patents, patent applications, and patent application publications are incorporated by reference.

Unless otherwise defined, all technical and scientific terms used herein have the same meaning as commonly understood by one of ordinary skill in the art to which this invention belongs. In case of conflict with patent applications incorporated herein by reference, the present specification, including definitions, will control.

Figure 14:
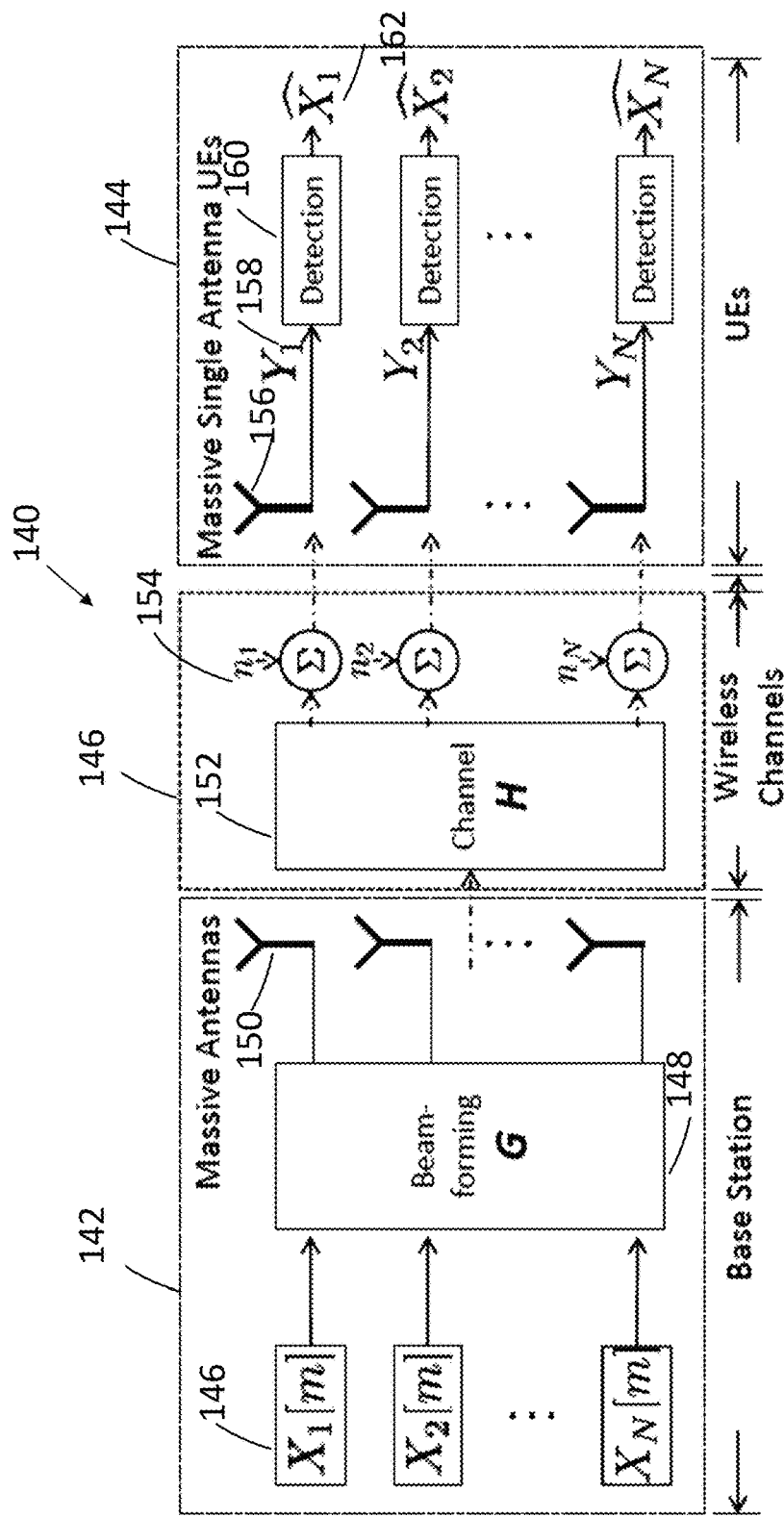
FIG. 14 shows an exemplary diagram showing the MMIMO system in downlink.

An exemplary diagram of a MMIMO communication system 140 is shown in FIG. 14. The system 140 includes a base station 142 that communicates with massive single antenna user equipment devices 144 through wireless channels 146. At the base station 142, data symbols $X_1[m]$ to $X_N[m]$ intended for the $1^{st}$ to the N-th user equipment devices 144 are processed by a beam-forming module 148, which generates the wireless signals to be transmitted by the transmitter antennas 150. The wireless signals transmitted by the antennas 150 propagate through wireless channels 146, collectively represented as H 152, in which noise $n_i$ 154 is added to the signal received by the i-th user equipment device 144. In FIG. 14, only one base station 142 is shown. The system 140 can include multiple base stations 142.

At the first user equipment device 144, data symbols $Y_1$ 158 are received at a first receiver antenna 156. A first detection module 160 processes the data symbols $Y_1$ 158 to generate detected data symbols $\hat{X}_1$. Similarly, at the i-th user equipment device 144, data symbols $Y_i$ 158 are received at an i-th receiver antenna 156. An i-th detection module 160 processes the data symbols $Y_i$ 158 to generate detected data symbols $\hat{X}_i$.

The MMIMO system and channel model can be described as follows. Suppose there are M BSs each having a large number of antennas $\Phi$, and there are N UEs each with a single antenna with $1 \ll N \ll \Phi$. Similar to the TR wideband system, the operation of the MMIMO antenna system 140 also includes two phases: the channel state information (CSI) acquisition phase using an uplink pilot and the data transmission phase. Here, the CSI is assumed to be perfectly known by the BSs so that they can perform beamforming to support multiple UEs' data transmission. Let us denote the beamforming matrix of the i-th BS as $G_i = \{g_{i,1}, g_{i,2}, \ldots, g_{i,|N_i|}\}$, where $G_i \in X^{\Phi \times |N_i|}$, $g_{i,j} \in X^{\Phi \times 1}$, and $N_i$ represents the set of UEs that associate with the i-th BS and the number of UEs in $N_i$ is denoted as $|N_i|$. Note that the beamforming matrix can be MRC (maximal-ratio combining), ZF (zero-forcing), or MMSE (minimum mean square error). Suppose $s_i = [s_{i,1}, s_{i,2}, \ldots, s_{i,|N_i|}]^T$ is the transmit symbols of the i-th BS with length determined by the number of UEs that are associated with the base station, where $s_i \in X^{|N_i| \times 1}$ and $E(s_i s_i^*) = I$.

The channel is assumed to be regular wideband channel, which refers to a channel with bandwidth significantly exceeding the coherence bandwidth of the channel such that there is frequency-selective fading. Assume OFDM is employed to provide a group of single-tap frequency-flat channel for its sub-carriers. Thus, we assume flat fading for each link (transmit-receive antenna pair), and denote the small scale fading between the i-th BS and its associated UEs as follows:

$$H_i = \{h_{i,1}^T, h_{i,2}^T, \ldots, h_{i,|N_i|}^T\}, \quad (4)$$

where $\cdot^T$ represents the transpose operation. In such a case, we have $H_i \in X^{\Phi \times |N_i|}$ where X represents the complex domain, i.e., $h_{i,j} \in X^{1 \times \Phi}$ is the small-scale fading channel vector between the i-th BS and the j-th UE in N The received signal of the j-th UE can be expressed by $$Y_j = \sum_{i=1}^{M} \sqrt{P} d_{i,j}^{-\alpha/2} h_{i,j} G_i s_i + n_j, \quad (5)$$

where P represents the transmission power of each antenna, $d_{i,j}$ represents the distance between the i-th BS and the j-th UE, $\alpha$ is the path loss coefficient, $d_{i,j}^{-\alpha/2}$ represents the large scale attenuation, and $n_j$ represents the additive white Gaussian noise with zero mean and variance $\sigma^2$. Note that the inter-cell interference has been taken into account in equation (5), since the summation means the received signal from all other BSs besides the BS that the j-th user equipment is associated with. In order to achieve a similar setting as in the aforementioned TR wideband system, a one-tap receiver is also assumed for the MMIMO system.

When it comes to the medium access control of multiple users in multiple BSs, the signal-to-interference-plus-noise ratio (SINR) is an important performance metric for the user association and management. Since a user would maintain the connection with a specific BS for a while after association, the expected SINR would be more appropriate than the instantaneous SINR. The following describes the expected SINR performance. For TR wideband systems, the signal power is boosted by the "matched filter" due to the multipaths, i.e., the effective channel gain is equivalent to the central peak of the CIR autocorrelation. The interference can originate from several sources, e.g., ISI due to the channel delay spread, IUI due to the correlation among different users' CIRs in addition to the channel delay spread, and the inter-cell interference (ICI) that can be interpreted as IUI from other cells. Similarly, in MMIMO systems, the signal power is boosted by all antenna components, and the interference also comes from the correlation among different users' channels. The ISI can be generally neglected in MMIMO systems because OFDM is commonly adopted and the CIR at each subcarrier has only one tap.

Based on the analysis on the components of the SINR, we can derive a closed-form expression of the SINR when the physical layer parameters are given. In some implementations, the expected SINR expressions of both TR wideband systems and MMIMO systems share the same form, i.e., $SINR = \xi_1 / [\xi_2 + \xi_3(|\mathcal{N}_i| + 1) d_i^\alpha]$, in which $\xi_1$, $\xi_2$ and $\xi_3$ are the parameters that are determined by the PHY layer settings, e.g., the waveform design of the TR system or the beamforming design of the MMIMO system, the sub-index i represents the i-th BS, $|\mathcal{N}_{i,i}|$ represents the number of existing users that are already associated with the i-th BS, $d_i$ represents the distance between the i-th BS and a new user who is intent to access the network, and $\alpha$ represents the path loss coefficient. Here, $\xi_1$, $\xi_2$ and $\xi_3$ are shorthand notations for values calculated based on physical layer parameters. Examples of $\xi_1$, $\xi_2$ and $\xi_3$ are given in expressions (7a-7c) and (9). The similarity between the TR wideband system and the MMIMO system likely originate from the common spatial focusing phenomenon in both systems. Since the parameters $\xi_1$, $\xi_2$ and $\xi_3$ are constant for a given user, in order to achieve the highest data rate, the new user should associate with the BS that can bring the highest SINR, i.e., the one with minimal $(|\mathcal{N}_{i,i}|+1)d_i^\alpha$.

For a TR system, we can derive closed form expression for the received SINR as follows. In case of the equal power allocation scenario, i.e. the power for each UE belonging to the BS i is $$\frac{P}{|N_i|},$$

we can express the SINR as $$SINR_j = \frac{\xi_1}{\xi_2 + \xi_3(|N_{A_j}|+1)d_{A_j,j}^\alpha} \tag{6}$$

where the expressions of $\xi_1$, $\xi_2$ and $\xi_3$ are as follows:

$$\xi_1 = \frac{1+e^{\frac{LT_s}{\sigma_T}}}{1+e^{\frac{T_s}{\sigma_T}}} + \frac{1-e^{-\frac{LT_s}{\sigma_T}}}{1-e^{-\frac{T_s}{\sigma_T}}}, \tag{7a}$$

$$\xi_2 = 2\frac{e^{-\frac{T_s}{\sigma_T}}\left(1-e^{-\frac{(L-2+D)T_s}{\sigma_T}}\right)}{\left(1-e^{-\frac{DT_s}{\sigma_T}}\right)\left(1+e^{-\frac{T_s}{\sigma_T}}\right)} - \tag{7b}$$

$$\frac{\left(1+e^{-\frac{DT_s}{\sigma_T}}\right)\left(1+e^{-\frac{2LT_s}{\sigma_T}}\right) - 2e^{-\frac{(L+1)T_s}{\sigma_T}}\left(1+e^{-\frac{(D-2)T_s}{\sigma_T}}\right)}{\left(1-e^{-\frac{DT_s}{\sigma_T}}\right)\left(1+e^{-\frac{T_s}{\sigma_T}}\right)\left(1-e^{-\frac{LT_s}{\sigma_T}}\right)},$$

$$\xi_3 = \tag{7c}$$

$$\frac{\left(1+e^{-\frac{DT_s}{\sigma_T}}\right)\left(1+e^{-\frac{2LT_s}{\sigma_T}}\right) - 2e^{-\frac{(L+1)T_s}{\sigma_T}}\left(1+e^{-\frac{(D-2)T_s}{\sigma_T}}\right)}{\left(1-e^{-\frac{DT_s}{\sigma_T}}\right)\left(1+e^{-\frac{T_s}{\sigma_T}}\right)\left(1-e^{-\frac{LT_s}{\sigma_T}}\right)}\sum_{i=1}^{M}d_{i,j}^{-\alpha} + \sigma_j^2/P.$$

where we assumed an exponentially decaying power-delay profile for the channel impulse responses, $T_s$ is the sampling period of the system such that $1/T_s$ equals to the system bandwidth B, and $\delta_T$ is the root mean square delay spread of the channel. In case of the MMIMO system, again assuming equal power allocation scenario and maximal-ratio combining (MRC) beamforming, we can express the SINR as $$SINR_j = \frac{\xi_1'}{\xi_2' + \xi_3'(|N_{A_j}|+1)d_{A_j,j}^\alpha}, \tag{8}$$

where we define the parameters $\xi'_1$, $\xi'_2$ and $\xi'_3$ as follows:

$$\xi_1' = (\Phi+1)\gamma, \xi_2' = -\gamma, \xi_3' = \sum_{i=1}^{M}d_{i,j}^{-\alpha}\gamma + \sigma_j^2/P. \tag{9}$$

and the CSI $h_{i,j}^\Phi$ is modeled as a complex Gaussian random variable with zero mean and variance $\gamma$. As can be seen from equations (6) and (8), the SINR of both the TR wideband and MMIMO systems share the same expression.

Figure 2A:
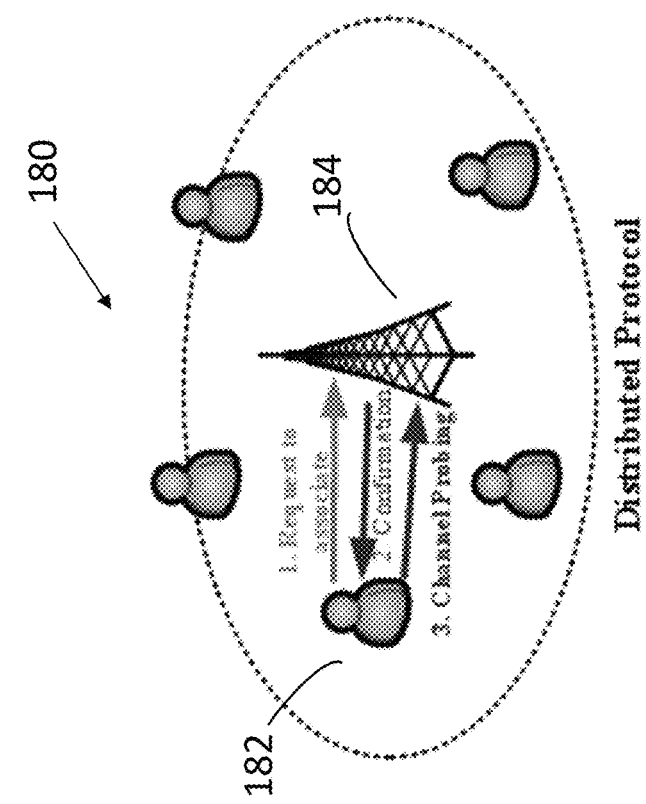
FIG. 2A shows a diagram of an exemplary communication system that uses a centralized protocol for user/network association.
Figure 2B:
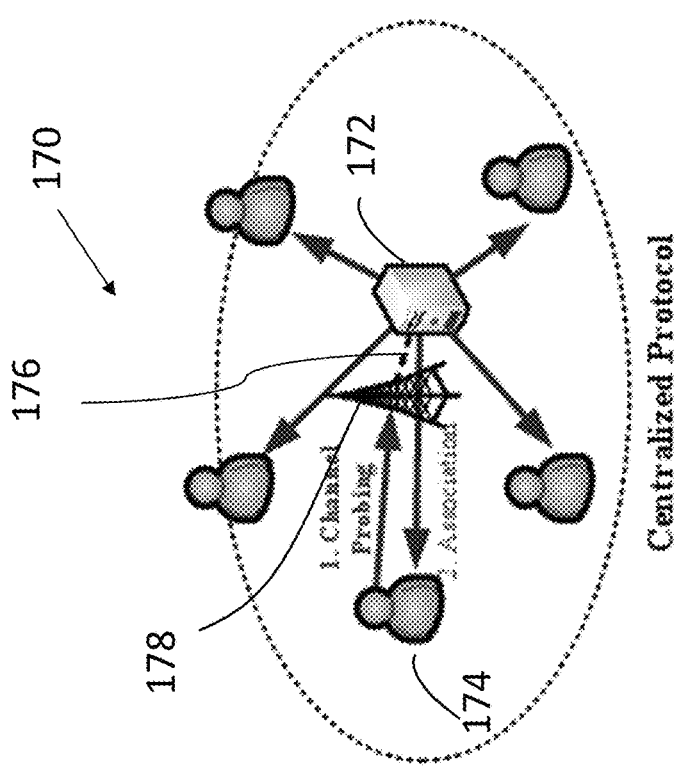
FIG. 2B shows a diagram of an exemplary communication system that uses a distributed protocol for user/network association.

FIG. 2A shows a diagram of an exemplary communication system 170 that uses a centralized protocol for user/network association. The figure shows only one base station 178, but the system can have multiple base stations. FIG. 2B shows a diagram of an exemplary communication system 180 that uses a distributed protocol for user/network association.

Referring to FIG. 2A, in some implementations, the system 170 uses a BS-UE association protocol with a centralized scheme in which a central computing entity or a central server 172 has access to all the relevant information and makes the decisions for the whole network. Each base station 178 has a network port that functions as an interface for connecting to the network. In many practical systems, UEs register and leave the network sequentially. Therefore, let us consider a dynamic UE arrival and association scenario. Suppose there are M BSs and N UEs in the network, where each BS is currently serving some existing UEs. Note that when referring to BS in this section, we will not differentiate between a TR wideband BS and a MMIMO BS due to the similarity.

Consider the situation in which a new UE 174 arrives at the network. A question arises as to which BS the new UE 174 should register and associate with. To answer this question, for each of the base stations, the central server 172 calculates an association indicator representing whether the terminal device can be associated with the base station based on a metric and/or load information and/or parameters $\xi_1$, $\xi_2$ and $\xi_3$ from expressions (7a) to (7c) or parameters $\xi'_1$, $\xi'_2$ and $\xi'_3$ from expression (9) below. Here, "load" refers to the number of user equipment devices that the base station is currently serving. For example, the metric can be determined based on the channel probing signal received from the terminal device. The metric can be a signal-to-interference ratio, a signal-to-noise ratio, a signal-to-interference-plus-noise ratio, a signal power, a distance between the terminal device and the base station, or a quality of service measure.

The new UE 174 should share the entire spectrum resource with all other UEs, but share the power resource only with UEs associated with the same BS. The existing UEs' performance may degrade due to the power sharing and inter-user interference from the new UE 174. Nevertheless, the existing UEs have the priority of maintaining current BS associations as well as the satisfied quality of service (QoS), which is a common assumption in current prevailing systems such as 3G and 4G. In the centralized scheme, the new UE's association should maximize the overall system throughput, sometimes referred to as the "social welfare" of the system, while given the condition that the existing UEs remain in the associated BSs and their resultant throughput can still satisfy the corresponding QoS requirement. Here, "overall system throughput" refers to the sum of data rate of all the UEs Let us use j' to represent the existing UEs and j to represent the new UE 174. We can model the association problem by the following $$\max \sum_{j'=1}^{N} R'_{j'} + R'_j \quad (10)$$

$$\text{s.t.} \quad R'_j \geq R_j^{th}, R'_{j'} \geq R_{j'}^{th} \, \forall \, j',$$

where $R'$ represents the UE's expected throughput after the newly arriving UE j joins the network, and $R^{th}$ represents the minimum QoS requirement of the UE. Here we only focus on downlink and the throughput refers to the data rate in downlink. Since all the existing UEs are supposed to maintain their connections to the current associated BSs, the optimization problem in expression (10) is equivalent to the following problem $$\max \sum_{j'=1}^{N} R'_{j'} + R'_j \Rightarrow \max \sum_{j'=1}^{N} R'_{j'} + R'_j - \sum_{j'=1}^{N} R_{j'}, \quad (11)$$

where $R_{j'}$ represents the existing UEs' expected throughput before the new UE joins the network. Moreover, since the overall transmission power of each BS is assumed to be fixed, the expected ICI should not be affected by the new arrival UE, i.e., the new one would not impose more ICI to the UE in a different BS. Instead, the new UE only affects the performance of the UEs that share the same BS with it due to the power sharing and IUI. Suppose the new UE j accesses BS $A_j$, we can re-write expression (11) as follows:

$$\sum_{j'=1}^{N} R'_{j'} + R'_j - \sum_{j'=1}^{N} R_{j'} = \quad (12)$$

$$R'_j + \sum_{j' \in N_{A_j}} (R'_{j'} - R_{j'}) = \log \left( \frac{\xi_1 + \xi_2 + \xi_3(|N_{A_j}|+1)d^\alpha_{A_j,j}}{\xi_2 + \xi_3(|N_{A_j}|+1)d^\alpha_{A_j,j}} \cdot \xi_{4,A_j} \right),$$

where $\xi_{4,A_j}$ is $$\xi_{4,A_j} = \quad (13)$$

$$\prod_{j' \in N_{A_j}} \frac{\xi_1 + \xi_2 + \xi_{3,j'}(|N_{A_j}|+1)d^\alpha_{A_j,j'}}{\xi_2 + \xi_{3,j'}(|N_{A_j}|+1)d^\alpha_{A_j,j'}} \cdot \frac{\xi_2 + \xi_{3,j'}|N_{A_j}|d^\alpha_{A_j,j'}}{\xi_1 + \xi_2 + \xi_{3,j'}|N_{A_j}|d^\alpha_{A_j,j'}},$$

representing the existing UEs' performance loss due to the admission of the new UE 174. Thus, the optimization problem in expression (10) can be transformed to the following expression:

$$\operatorname*{argmax}_{A_j} \frac{\xi_1 + \xi_2 + \xi_3(|N_{A_j}|+1)d^\alpha_{A_j,j}}{\xi_2 + \xi_3(|N_{A_j}|+1)d^\alpha_{A_j,j}} \cdot \xi_{4,A_j} \quad (14)$$

$$\text{s.t.} \quad R'_j \geq R_j^{th}, R'_{j'} \geq R_{j'}^{th} \, \forall \, j'$$

Note that there is only one variable $A_j$ in the expression (14) and the variable $A_j$ can only be one of the M BSs, solving the problem is as simple as a linear search. Based on the formulation in expression (14), we can design a centralized network association protocol as follows. When a new UE intends to join the network, the new UE first broadcasts a channel probing signal (e.g., an impulse signal or some other waveform) to all BSs, such that the BSs can obtain the CIR information as well as estimate the corresponding distance to the new UE according to the received signal strength. Then, all the BSs report the CIR and distance information and the load status (the number of UEs that each BS is currently serving) to the central server 172 through a backhaul (e.g., 176), in which the central server 172 is responsible for calculating the parameters $\xi_1$, $\xi_2$ and $\xi_3$ in expression (14) as well as the optimal BS that the new UE should access. Once the optimal base station is determined, the association indicator calculated by the central server 172 will indicate which base station the terminal device can be associated with. For example, for the optimal base station, the central server 172 will send an association indicator to the optimal base station indicating that the new UE can be associated with the optimal base station. For the other base stations, the central server 172 will send association indicators to those other base stations indicating that the new UE should not be associated with those other base stations. Algorithm 1 below summarizes the details of an example of the network association protocol. Algorithm 1 is also shown in FIG. 3. Notice that this centralized scheme requires a central server 172 to gather all the information from the BSs (e.g., 178), which would inevitably incur additional communication costs and delay. In the following, we will describe a distributed scheme without requiring such a central server.

---
Algorithm 1 Centralized Network Association Protocol
---

1: /** Channel Probing Phase **/
2: The new arrival UE j broadcasts an impulse signal.
3: The BSs calculate the CSI and estimate the distance according to the signal strength.
4: /** BS Association Phase **/
5: All the BSs report the distance and load information to the central server.
6: The server calculates the parameters $\xi_1$, $\xi_2$, $\xi_3$ using (7a-7c) for TR wideband systems or using (9) for massive MIMO systems.
7: The server compares the overall expected throughput using (14), decides an optimal BS for the new UE, and then notifies the optimal BS.
8: The optimal BS sends a synchronization signal to the new UE to establish connection.
9: /** BS Data Transmission Phase **/
10: The optimal BS transmits data to the associated UEs concurrently.

---

In the example above, the BS determines a signature waveform for the new UE based on a time-reversed waveform of a channel response signal derived from the channel probing signal sent from the new UE. The BS determines a downlink transmit signal for the new UE based on the downlink data intended for the new UE and the signature waveform for the new UE. The BS also determines the downlink transmit signals for the existing UEs based on the downlink data intended for the existing UEs and the signature waveforms for the existing UEs. The downlink transmit signals for the new and existing UEs are combined into a combined downlink transmit signal. The BS transmits the combined downlink transmit signal to the new and existing UEs.

In the Algorithm 1 described above, the central server takes into account of the base station load information when determining the association between user equipment devices and base stations. By contrast, a conventional MAC design may only consider the received signal power strength without considering the loads of the base stations. By taking the base station loads into account, the Algorithm 1 can result in better overall throughput compared to the conventional MAC design.

FIG. 2B shows a distributed UE association scheme 180, in which there is no central computing and decision making entity. Since there is no global information available about the entire network in the distributed scheme, a newly arriving UE (e.g., 182) has to make its own decision about which BS (e.g., 184) the UE should associate with. Moreover, the performance degradation of the existing UEs is also unknown to the new UE 182 due to the limited information available to the new UE 182. Nevertheless, the BS 184 can decide whether to admit the new UE 182 for the sake of ensuring that the existing UEs' QoS should be guaranteed. In such a case, the newly arriving UE 182 can only make the association decision in a greedy manner, i.e., selecting the BS 184 that can provide the highest expected throughput, which can be formulated by the following problem $$\max R_j = \log(1 + SINR_j) \quad (15)$$

$$\Rightarrow \max SINR_j = \frac{\xi_1}{\xi_2 + \xi_3(|N_{A_j}|+1)d^\alpha_{A_j,j}},$$

$$\text{s.t. } R'_j \geq R^{th}_j, R'_{j'} \geq R^{th}_{j'} \forall j',$$

where the definition of the notations are the same with that in expression (10). Since the parameters $\xi_1$, $\xi_2$ and $\xi_3$ are constant for a specific new UE, the problem in expression (15) can be simplified as $$\operatorname*{argmin}_{A_j}(|N_{A_j}|+1)d^\alpha_{A_j,j} \quad (16)$$

$$\text{s.t. } R'_j \geq R^{th}_j, R'_{j'} \geq R^{th}_{j'} \forall j'.$$

Solving the problem in expression (16) involves a simple linear search. Consider an example in which there are two BSs: When the load of each BS is given, e.g., the number of existing UEs in each BS is $N_1$ and $N_2$, respectively, the UE can compare the distance according to the following rule to make the association decision:

$$\frac{d_{1,j}}{d_{2,j}} / \left(\frac{|N_2|+1}{|N_1|+1}\right)^{1/\alpha}.$$

Due to the small IUI in TR wideband and massive MIMO systems, the social welfare (e.g., sum of user data rates) of the distributed association protocol is similar to that of the centralized protocol. The distributed network association protocol without a central server is summarized in Algorithm 2 shown below. Algorithm 2 is also shown in FIG. 4. The BSs periodically broadcast the beacon signals to the network, including its ID information as well as the current load status, i.e., the number of existing UEs associated with the base station. When a new UE intends to join the network, the new UE can receive beacon signals from the neighboring BSs. The distance between the new UE and the BSs can be roughly estimated by the signal strength and the path loss model. Thus, by calculating expression (16) using the distance and load information, the new UE can determine a priority list of BSs from the high SINR to the low one. Then, the new UE sends a request-to-access packet to the first BS on the list. When a BS receives a request, the BS checks the constraints in expression (16) to make sure the existing UEs' QoS requirement can still be satisfied. If this can be confirmed, the BS sends a confirmation to the new UE to establish connections. If no confirmation is received within a certain period, the UE sends a request to the second BS on the priority list, and so on and so forth.

---

Algorithm 2 Distributed Network Association Protocol

1: /** BS Association Phase **/
2: The BSs broadcast the beacon signals with load status.
3: The new arrival UE detects the beacon signals and estimates the distance to the BSs.
4: The new UE calculates a priority list of BSs according to expression (16).
5: The new UE sequentially sends a request to each of the BSs on the list until a confirmation is received.
6: The BS decides whether to send a confirmation to the new UE according to the constraints in expression (16).
7: /** Channel probing phase **/
8. The new UE sends an impulse (or probe) signal to the confirmed BS.
9: The confirmed BS records the CSI and utilizes it for waveform or beamforming design.
10: /** Data transmission phase **/
11: The optimal BS transmits data to the associated UEs concurrently.

---

In the Algorithm 2 described above, the new UE calculates the priority list of BSs according to expression (16), which takes into account of the base station load status. This is different from a conventional MAC design that only considers the received signal power strength without considering the loads of the base stations. By taking the base station loads into account, the Algorithm 2 can result in better overall throughput compared to the conventional MAC design.

The following describes the SINR performance of the newly arriving UE in the TR and MMIMO systems. FIG. 5 is a graph 190 that shows the relationships between the new UE's SINR and the number of existing UEs in a TR system, from 1 UE to 10 UEs. A curve 192 represents data for the situation in which the distance from the new UE to the base station is 1 m. A curve 194 represents data for the situation in which the distance from the new UE to the base station is 5 m. A curve 196 represents data for the situation in which the distance from the new UE to the base station is 10 m. The distances between the new UE and the other two interference BSs are set as 20 m.

FIG. 6 is a graph 200 that shows the relationships between the new UE's SINR and the number of existing UEs in a MMIMO system, from 1 UE to 10 UEs. A curve 202 represents data for the situation in which the distance from the new UE to the base station is 1 m. A curve 204 represents data for the situation in which the distance from the new UE to the base station is 5 m. A curve 206 represents data for the situation in which the distance from the new UE to the base station is 10 m. The distances between the new UE and the other two interference BSs are set as 20 m.

Generally, the results in FIGS. 5 and 6 show that when the number of existing UEs increases, i.e., the associated BS becomes more and more crowded, the SINR of each individual UE decreases due to the power sharing and IUI. Meanwhile, the farther distance between the new UE and the associated BS can also lead to decreased SINR due to the path loss. Moreover, we also show the numerical achievable data rate of the new UE in a graph 210 in FIG. 7. The graph 210 includes bars 212 that represent the new UE's achievable data rate (Mbps) for a TR wideband system having 1 GHz bandwidth, and bars 214 that represent the new UE's achievable data rate (Mbps) for a massive MIMO system having 100 antennas. Note that the TR wideband data rate is calculated by B/D log(1+SINR) taking into account of the rate back-off factor D, and the massive MIMO data rate is calculated by B log(1+SINR). Both systems can achieve high throughput either by a wide bandwidth, e.g., greater than 200 MHz, for TR wideband or by a large number of antennas for massive MIMO.

Note that the objective function (e.g. maximizing the sum rates in expression (10) or individual rate in expression (15)) and constraints described above are merely examples. In wireless communication systems, various quality of service (QoS) metrics or combination of various QoS metrics, such as packet/bit error rates, bit rate, throughput, transmission delay, availability, jitter, etc., can be the objective and/or constraints in deciding user association. For example, the availability metric can refer to the availability of resources that can be represented by the ratio between the total time some resources are capable of being used during a given interval and the duration of the interval. The jitter metric can refer to the variation in delay for an audio or a video application.

Scheduler Design

When multiple users access the network to obtain service, the available resources such as bandwidth, power, and transmission time slots may not be enough to support all the users and enabling all of their individual requirements to be met. In order to reasonably distribute the limited resources between different users with diverse needs, a scheduler distributes the available resources to the users in order to increase the system-wise resource utilization and fairness between users.

By utilizing the spatial focusing effect, a general scheduler design is described here that is applicable to both MMIMO and TR wireless systems, based on a number of physical-layer parameters and QoS requirements from the upper layers of the OSI model, such as the application, representation, session, transport, and network layers that are above the MAC sublayer. An example of the upper layer QoS requirements is the transmission delay constraints in video streaming applications that require very short transmission delays so that users do not have to wait for long pauses while watching the streamed videos.

The relevant physical-layer parameters may include the instantaneous channel impulse responses (CIRs) between the users and the BSs, the computed location-specific signature waveforms for a given user, a given user's transmit power, and the users' SNIR requirements. Based on this information, the instantaneous signal-to-interference-plus-noise ratio can be calculated for each user, and the scheduler can calculate the transmission rate using the instantaneous signal-to-interference-plus-noise ratio. Each of the users is also associated with a specific weight to indicate the relative importance among the users. The scheduling problem of distributing the limited transmission time and frequency resources among users can be formulated as an optimization problem. In the optimization problem, the objective is to select a subset of users for transmission to maximize the weighted sum rates of the users. The constraints of the optimization problem are that the selected users have to meet their corresponding QoS requirements set by the upper layers (e.g., time slot, frequency band, or CDMA code). It is possible to convert both the objective function, which is the previously mentioned weighted sum rates, and the constraints, which are the QoS requirements, to be quadratic, transforming the problem into a mixed integer quadratic constraint quadratic programming (MIQCQP) problem, described in more detail below. This formulation yields near-optimal solution, while offering substantially lower computational complexity than exhaustive search.

When describing the MAC scheduler, N will denote the number of users/terminal devices (TDs). Without loss of generality, we will describe downlink transmission (BS to user) as a detailed example. A similar framework can be built for uplink transmission (user to BS) as well.

In case of the TR communication system as shown in FIG. 13, the base station (BS) 102 first upsamples the symbol stream 108 for user i by the back-off factor $D_i$. The upsampling can be performed by, e.g., the rate matching module 110. The upsampled symbols 132 are encoded using the corresponding waveforms $g_i$ that are assigned to the users. The encoding can be performed using, e.g., the module 112. The encoded symbols for multiple users are combined by, e.g., the summation module 116 to generate a combined downlink signal, also referred to as a summed signal 118. The BS 102 transmits the summed signal 118 with a single antenna and the transmitted signal passes through channels $h_i$ associated with the users. The users adjust the power using one tap gain (e.g., using the gain module 120), downsample the received signal (e.g., using the down-sampling module 122), and then perform detection to estimate and recover the transmitted symbols (e.g., using the detection module 124).

Using the time reversed and conjugated CIR $h_i$ between the BS and user i as the waveform $g_i$, user i obtains the maximum signal power due to the spatial focusing effect. However, the inter-user interference (IUI) and inter-symbol interference (ISI) reduce the SINR of users. In some implementations, the TR waveform $g_i$ can be specifically and jointly designed for the system to meet system requirements. The term "TR waveform $g_i$" is used generally to refer to a waveform that is the time reversed and conjugated CIR $h_i$, or a waveform derived from the time reversed and conjugated CIR $h_i$.

In case of the MMIMO system 140 as shown in FIG. 14, there are M antennas 150 in the base station (BS) 152 serving K one-antenna terminal devices (TDs) 144. The channel $h_i^M$ from the base station to the user i can be represented by an M by 1 vector in which the jth element represents the channel from the jth antenna to the ith user. We assume a narrowband MMIMO system that observes one tap channel due to the limited subcarrier granularity. Proper beamforming vectors $g_i^M$ can be designed to steer the energy to the intended user i using, e.g., the maximum ratio combining (MRC) transmission and zero-forcing (ZF) beamforming approaches.

Due to the similarities between the TR and the MMIMO systems, each CIR tap in the TR system can be considered as a virtual link (virtual transmit/receive antenna pair) between the user and the BS, and the calculation of the transmit waveform for the TR system can be similar to the calculation of the beamforming vector in the MMIMO system. Therefore, we can use a unified approach and unified notation to describe the MAC scheduling algorithm, which is applicable to both TR and MMIMO systems.

In case of the TR system (e.g., 100 in FIG. 13), we can characterize the interference between the users based on the unit power channel $h_i$ and the waveforms $g_i$. A normalized interference matrix Z is used to represent the interference among users. The $(i,j)^{th}$ entry $Z_{i,j}$ of the normalized interference matrix Z refers to the interference from user j to user i. Therefore, $Z_{i,j}$ is determined by the channel $h_i$ from the BS to the user i and the waveform $g_j$ used to transmit to user j.

$Z_{i,j}$ is calculated using unit power $h_i$ and unit power $g_j$, and therefore the name normalized interference matrix. We separate $p_j$ in the calculation of $Z_{i,j}$ because the power allocation and the waveforms are not necessarily designed together and the separation expands the occasions where the scheme is applicable. The notation $p_j$ refers to the power allocated to the user j. The normalized interference between users can therefore be represented as $$Z_{i,j} = \sum_{l=0}^{\frac{2L-2}{D}} |(h_i * g_j)[Dl]|^2, \quad (17)$$

$$Z_{i,i} = \sum_{l=0, l \neq (L-1)/D}^{\frac{2L-2}{D}} |(h_i * g_i)[Dl]|^2, \quad (18)$$

where equations (17) and (18) represent the IUI and ISI for user i, respectively, L is the length (number of taps) of the channel impulse responses, and D is the rate back-off factor. On the other hand, the entries for the interference matrix for the MMIMO system (e.g., 140 in FIG. 14) can be calculated as $$Z_{i,j} = |(h_i^M)^T g_j^M|^2, \quad (19)$$

and there is no ISI in the MMIMO system due to the assumption of limited subcarrier granularity, and a single tap-channel is observed.

The scheduler objective and the constraints can be formulated as follows. Suppose that the physical layer provides the scheduler with the normalized interference matrix Z between users, the allocated power p and the path gain $G_i$ between the BS and user i. The scheduler gathers the transmission rate requirements $R_i$ from the application layer for proper operation if user i is selected to transmit. For specific transmission rate requirements $R_i$, we can obtain the corresponding minimum SINR requirement $\gamma_i$ by the one-to-one mapping between transmission data rate and SINR. The scheduler maintains a set of weights $w_i$ to indicate the relative importance of each user. Based on the collected information and requirement, the scheduler objective that maximizes the system weighted sum rate is formulated as $$\underset{x}{\text{maximize}} \quad \Sigma_i w_i x_i \log_2\left(\frac{G_i p_i}{G_i \Sigma_j p_j Z_{i,j} x_j + \sigma_i^2} + 1\right) \quad (20)$$

$$\text{subject to} \quad x_i \in \{0, 1\}, \Sigma_i p_i x_i \leq P_{max},$$

$$\frac{G_i p_i x_i}{G_i \Sigma_j p_j Z_{i,j} x_j + \sigma_i^2} \geq \gamma_i x_i, \forall i.$$

The user i is assigned with a weight $w_i$ that represents the relative importance of the user. A higher weight $w_i$ indicates that the user i has a relatively higher priority and needs more resources allocated to it, and the scheduler can respond to the need properly. The variable $x_i$ is the binary variable indicating whether user i is selected or not. The logarithm term is the transmission rate of user i, which is affected by the selected user set for transmission. Therefore, the objective of the optimization problem is the system weighted sum rate.

In expression (20), the maximal transmi power $P_{max}$ is a constraint for determining the variables $x_i$. Expression (20) shows that the optimal values of $x_i$ are dependent on various other parameters, such as the weights coefficients $w_i$, the allocated transmit power p, the path gains $G_i$ between the BS and the user i, the minimum SINR requirements $\gamma_i$, and the normalized interference matrix Z between users. Some of these parameters, such as the normalized interference matrix Z, the allocated transmit power p, and the path gains $G_i$ can be included in a set of physical layer information provided by the physical layer to the scheduler.

The first constraint requires the decision variables $x_i$ to be binary, and $x_i=1$ represents user i is selected to transmit, while $x_i=0$ represents that user i is not selected to transmit over the currently considered transmission resource. The second constraint requires that the sum of the transmitting power of the selected users to be no more than the maximum BS transmitting power. The third set of constraints corresponds to the minimum SINR requirements $\gamma_i$ that the selected users must meet, and therefore the selected users meet the minimum transmission rate requirement $R_i$. Note that the objective function and constraints described above are merely examples. In wireless communication systems, various quality of service (QoS) metrics or a combination of various QoS metrics can be the objective and/or constraints in deciding the user association, for instance packet/bit error rates, bit rate, throughput, transmission delay, availability, jitter, etc.

We can simplify the above formulation and express it as a mixed integer optimization problem. This allows us to arrive at a problem formulation whose solution can be found with significantly reduced computational complexity than the original problem. In some implementations, this formulation is the mixed integer quadratic constraint quadratic programming (MIQCQP) formulation.

One property for binary decision variables that is used in the optimization formulation is as follows:

$$x_i^2 = x_i, \forall i. \quad (21)$$

This relationship helps convert some of the quadratic terms into linear terms in the system objective and the constraints. If the scheduler operates in the high signal-to-noise ratio (SNR) region, we can omit the noise term $\sigma_i^2$ at the receiver and the plus 1 term in the logarithm function. Also, the path gains $G_i$ cancel each other and the optimization objective becomes $$\underset{x}{\text{maximize}} \quad \Sigma_i w_i x_i \log_2\left(\frac{p_i}{\Sigma_j p_j Z_{i,j} x_j}\right) \quad (22)$$

$$\text{subject to} \quad x_i \in \{0, 1\}, \Sigma_i p_i x_i \leq P_{max}$$

$$\frac{p_i x_i}{\Sigma_j p_j Z_{i,j} x_j + \sigma_i^2 / G_i} \geq \gamma_i x_i, \forall i$$

We decompose the objective function into two terms using characteristics of the logarithm function as the following $$\underset{x}{\text{maximize}} \Sigma_i w_i x_i \log_2\left(\frac{p_i}{\Sigma_j p_j Z_{i,j} x_j}\right) \equiv \quad (23)$$

$$\underset{x}{\text{maximize}} \Sigma_i w_i x_i \ln p_i - \Sigma_i x_i w_i \ln(\Sigma_j p_j Z_{i,j} x_j).$$

Next, we linearize the second logarithm term using the Taylor expansion of logarithm at $x_0=1$ and use the constant term and the first order term. Note that the Taylor expansion for logarithm function to the linear term is a global overestimator of the logarithm function. Let p, w be the power and weight vector of length N of the users respectively. The second term in the expression (23) can be simplified as $$\Sigma_i w_i x_i \ln(\Sigma_j p_j Z_{i,j} x_j) \leq \Sigma_i w_i x_i (\Sigma_j p_j Z_{i,j} x_j) - w^T x \quad , \quad (24)$$
$$= x^T (\text{diag}(w) Z \text{diag}(p)) x - w^T x$$

where the diag (·) operation generates a diagonal matrix using the elements in the vector. The inequality comes from the upper bound of Taylor expansion of the natural logarithm to the linear term. Define A=diag (w)Z diag (p) and ∘ as the Hadamard product of two vectors. The objective function can be represented as $$\Sigma_i w_i x_i \ln\left(\frac{p_i}{\Sigma_j p_j Z_{i,j}}\right) \geq (\ln(p) \circ w)^T x - x^T A x + w^T x \quad (25)$$

$$= (\ln(p) \circ w + w)^T x - \frac{1}{2} x^T (A + A^T) x, \quad (26)$$

where expression (25) follows the property of Taylor expansion. The original objective function is transformed into expression (26). However, it is not guaranteed that the optimal vector $x_{opt}$ for expressions (23) and (26) are the same. The optimal vector $x_{opt}$ is output by the scheduler and is an indicator of whether a user can transmit. Depending on context, the optimal vector, or the individual bits of the optimal vector, is referred to as a "transmission indicator." For example, suppose there are 10 users, then $x_{opt}$ is a 10-bit vector, in which the i-th bit indicates whether the i-th user is selected to transmit. If the i-th bit is equal to 1, i.e., $x_i=1$, it indicates that the i-th user is selected to transmit over the currently considered transmission resource. If the i-th bit is equal to 0, i.e., $x_i=0$, it indicates that the i-th user is not selected to transmit.

We can define $I_N$ as an identity matrix of size N and 1 be an all 1 vector of corresponding size. We can add $$\frac{c}{2} x^T I_N x$$

$x^T I_N x$ and subtract $$\frac{c}{2} 1^T x$$

$1^T x$ to an expression without changing its value because $$\frac{c}{2} x^T I_N x$$

$x^T I_N x$ has the same value as $$\frac{c}{2} 1^T x$$

$1^T x$ according to expression (21). Here, c is a constant larger than the smallest eigenvalue of $A+A^T$. Since the same value is added and subtracted in the objective function, it does not change the objective value or the feasible set. Define $Q=A+A^T+cI_N$, we arrive at the final formulation as $$\underset{x}{\text{maximize}}(\ln(p) \circ w + w)^T x - \frac{1}{2} x^T (A + A^T) x \equiv \quad (27)$$

$$\underset{x}{\text{minimize}} \frac{1}{2} x^T (A + A^T + cI_N) x - \left(\ln(p) \circ w + w + \frac{c}{2} 1\right)^T x \equiv$$

$$\underset{x}{\text{minimize}} \frac{1}{2} x^T Q x - \left(\ln(p) \circ w + w + \frac{c}{2} 1\right)^T x.$$

The second constraint can be written as $$p^T x \leq P_{max} \quad (28)$$

For the third constraint, we have the minimum SINR constraint for user i as, $$\frac{p_i x_i}{\Sigma_j p_j Z_{i,j} x_j + \sigma_i^2 / G_i} \geq \gamma_i x_i \quad (29)$$

$$\equiv x_i \Sigma_j p_j Z_{i,j} x_j + \left(\frac{\sigma_i^2}{G_i} - \frac{p_i}{\gamma_i}\right) x_i \leq 0, \quad (30)$$

Let $0_{n,m}$ be a n-by-m all zero matrix. Define $B_i$ as an all zero matrix with i-th row to be the Hadamard product of $z_i$, the i-th row of Z, and the transpose of the power allocation vector p as follows $$B_i = \begin{bmatrix} 0_{i-1,N} \\ z_i \circ p^T \\ 0_{N-i,N} \end{bmatrix}. \quad (31)$$

Define $q_i$ as an all zero vector of length N, except for the ith component being $\sigma^2/G_i - p_i/\gamma_i$, $$q_i = \begin{bmatrix} 0_{i-1,1} \\ \frac{\sigma^2}{G_i} - \frac{p_i}{\gamma_i} \\ 0_{N-i,1} \end{bmatrix}. \quad (32)$$

The constraint can be represented as $$x^T B_i x + q_i^T x \leq 0, \forall i \equiv \frac{1}{2} x^T (B_i + B_i^T + c_i 1_N) x + \left(q_i^T - \frac{c_i}{2} 1\right) x \leq 0, \quad (33)$$

$$\forall i \equiv \frac{1}{2} x^T Q_i x + \left(q_i^T - \frac{c_i}{2} 1\right) x \leq 0, \forall i,$$

where $Q_i = B_i + B_i^T + c_i I_N$. $c_i$ is a constant that is larger than the minimum eigenvalue of $B_i + B_i^T$. Based on the above transformation, the whole optimization problem is formulated as $$\underset{x}{\text{minimize}} \quad \frac{1}{2} x^T Q x - \left(\ln(p) \circ w + w + \frac{c}{2} 1\right)^T x \quad (34)$$

$$\text{subject to} \quad x_i \in \{0, 1\}, p^T x \leq P_{max}$$

$$\frac{1}{2} x^T Q_i x + \left(q_i^T - \frac{c_i}{2} 1\right) x \leq 0, \forall i,$$

which is an MIQCQP problem. This problem can be solved with much lower complexity using standard numerical solver algorithms.

After the scheduler determines the optimization vector $x_{opt}$, the base station combines the data intended to be transmitted to the i-th user with medium access layer parameters associated with the i-th user to generate a transmit data signal that is transmitted to the i-th user. The medium access layer parameters associated with the i-th user include the i-th bit of the optimization vector $x_{opt}$, or information derived from the i-th bit of the optimization vector. When the i-th user receives the transmit data signal and extracts the medium access layer parameters, the i-th user will know whether it has been selected to transmit over the currently considered transmission resource.

The advantages of the invention described above can be shown using simulation results. Time complexity is an important performance indication for a scheduler that performs in real time with a strict deadline. Moreover, the importance grows with the foreseeable sharp increase in the number of users in the system. FIG. 8 is a graph 220 that shows a comparison of the running time with number of users N ranging from 3 to 10 and D=4. The result shows $\mathcal{O}(2^N)$ complexity for exhaustive search (as represented by a curve 222), and $\mathcal{O}(N)$ complexity for the MIQCQP scheduler (as represented by a curve 224). As can be seen, the scheduler described in this invention has much lower computational complexity as the problem size grows.

Figure 9B:
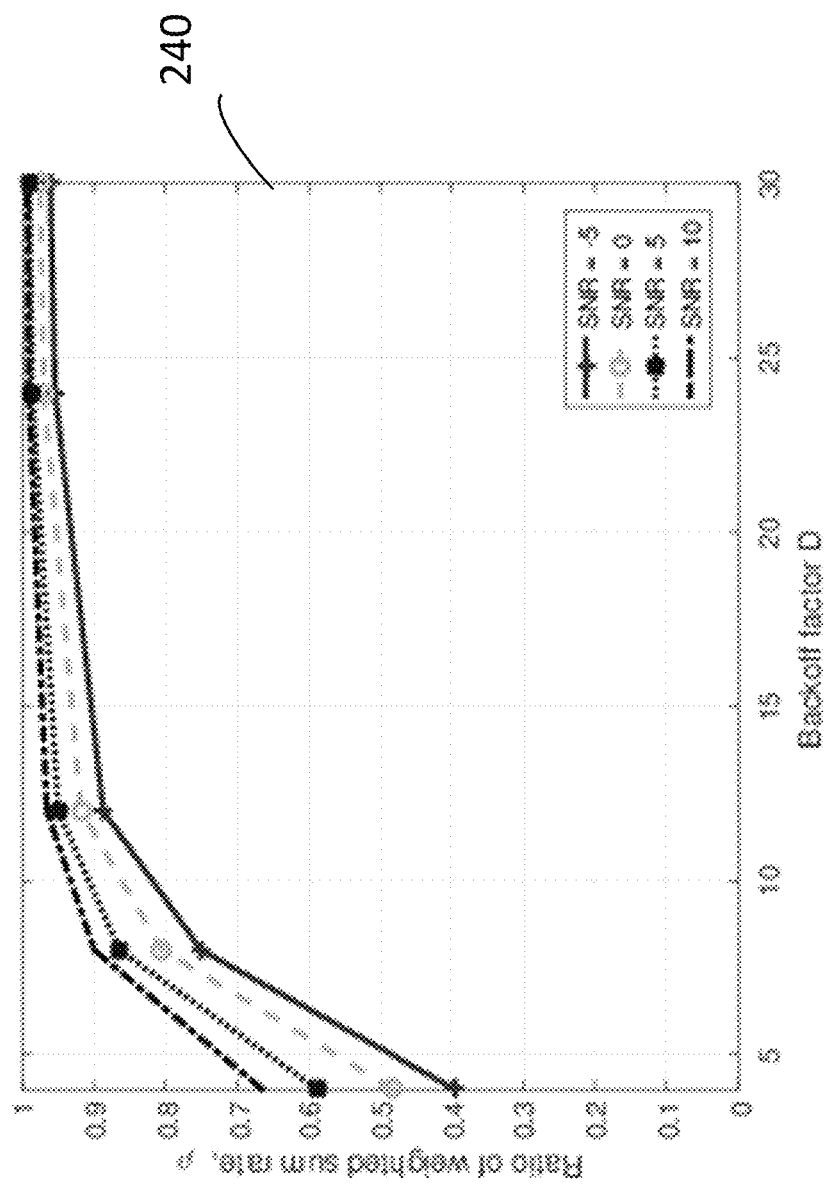
FIG. 9B shows an exemplary graph showing the performance of the scheduler of the present invention compared with exhaustive search result in the TR system, with different numbers of users, with different SNR levels.

To evaluate the performance of the weighted sum rate maximization scheduler, we compare the weighted sum rate of the weighted sum rate maximization scheduler $R_S$ with the weighted sum rate obtained by exhaustive search $R_{opt}$ by calculating the average of the ratio $\rho=R_S/R_{opt}$. We chose the back-off factor D=[4, 8, 12, 24, 30] and number of users N=[3, 5, 7, 9]. FIG. 9A is a graph 230 that shows the ratio $\rho$ with different N and D. For a small D, the deviation from optimality with large N comes from the errors at the linearization of the logarithm term around 1, because the actual sum is far from 1. However, when D increases, the entries of Z become smaller and the error due to expansion at 1 gets smaller. For larger N, such as when N=9 or larger, which is the targeted use case for the next generation system, the ratio $\rho$ increases rapidly to above 0.9 when D is larger than 8.

To evaluate the performance of the weighted sum rate maximization scheduler under different SNR conditions, we performed simulations in which all users have the same SNR selected from [−5, 0, 5, 10] dB. Simulations were performed with different back-off factors D=[4, 8, 12, 24, 30] and N=9, and the results are presented in a graph 240 in FIG. 9B. In the low SNR region, the MIQCQP approximation is not as accurate as the exhaustive search method and there is a gap between the performance of the weighted sum rate maximization scheduler and that of a scheduler that uses exhaustive search. However, the ratio $\rho$ increases over 0.9 when D is larger than 8 in most SNR cases. The weighted sum rate maximization scheduler separates the physical layer implementation, because it only needs the interference information caused by the transmission from the other users and not closely linked to a specific implementation of the signature waveform. The separation of the scheduler from a specific waveform $g_j$ makes the scheduler suitable for different waveform design schemes and power allocation algorithms.

We also evaluated the scheduler performance on the massive MIMO system. We assume flat fading channels, i.e. one tap channel, on each link of the massive MIMO system. Each link is modeled as a complex Gaussian random variable with zero mean and unit power as CN (0, 1). The beamforming vector $g_i$ is selected as the maximum ratio combining (MRC) scheme, in which $g_i$ is the complex conjugate of the channel link $h^*_i$. We set the number of users N=[3, 7, 10, 13] and the number of antennas M=[10, 20, 30, 40] and simulate 2000 channel realizations. FIG. 10 is a graph 250 that shows the ratio $\rho$ for the weighted sum rate maximization scheduler. Curves 252 indicate that the ratio $\rho$ approaches to 1 in all cases we simulated.

The approach described above can also be extended to multi-cell (multi-BS) wireless systems. The same formulation methodology can be applied to downlink cooperative multipoint (CoMP) scenarios with changes in the definition of variables and in the derivation of the normalized interference matrix Z. Let us consider a downlink scheduler in a multi-cell network with C full frequency-reusing and synchronized cells, C being a positive integer. Suppose that $N_k$ users are in cell k, k=1, . . . , C, and there is inter-cell interference (ICI) due to full frequency reuse among cells. To distinguish the users in different cells, we use superscript to indicate the index of the cell and use the subscript to indicate the user in a specific cell. Define $h_i^{k,l}$ as the normalized CIR from cell l to user i in cell k and define $g_j^l$ as the signature waveform for encoding information symbols (i.e., convolving the information symbols with the signature waveform) that is assigned to user j in cell l. Define $G_i^{k,l}$ as the path gain from cell l to the user i in cell k. Suppose all users in all cells use the same back-off factor D. Let $Z^{k,k}$ denote the $N_k$ by $N_k$ normalized interference matrix within cell k similar to those defined in expressions (17)-(19). Let $Z^{k,l}$ be the $N_k$ by $N_l$ ICI matrix. $Z_{i,j}^{k,l}$, the (i,j)$^{th}$ term of $Z^{k,l}$, represents the ICI to the user i in cell k due to the transmitted signal to user j in cell l. $Z_{i,j}^{k,l}$ is defined as $$Z_{i,j}^{k,l} = \sum_{t=0}^{\frac{2L-2}{D}} \frac{G_i^{k,l}}{G_i^{k,k}} |(h_i^{k,l} * g_j^l)[Dt]|^2, \quad (35)$$

where $G_i^{k,k}$ in the denominator is provided to cancel the same term later in the formulation. We can define the normalized interference matrix $\tilde{Z}$ in the multi-cell scenario as $$\tilde{Z} = \begin{bmatrix} Z^{1,1} & Z^{1,2} & \cdots & Z^{1,C} \\ Z^{2,1} & Z^{2,2} & \cdots & Z^{2,C} \\ \vdots & \vdots & \ddots & \vdots \\ Z^{C,1} & Z^{C,2} & \cdots & Z^{C,C} \end{bmatrix}. \quad (36)$$

Let $\tilde{N}=\Sigma_{k=1}^C N_k$ be the total number of users in all cells, and we define the new decision variable vector of length $\tilde{N}$ as $\hat{x}=[x_1^T x_2^T \ldots x_C^T]^T$, and the new power vector of length $\tilde{N}$ as $\hat{p}=[p_1^T p_2^T \ldots p_C^T]^T$. The total interference $\mathcal{I}_i^k$ including ISI, IUI and ICI to user i in cell k is $(G_i^{k,k}\tilde{Z} \text{ diag }(\hat{p})\hat{x}) [\Sigma_{c=1}^{k-1} N_c+i]$, where the term in (·) is a vector of length $\tilde{N}$, and the operator [·] takes out the corresponding element in the vector. The weighted sum rate maximization in expression (22) can be reformulated using the newly defined variables and interference matrix as $$\underset{\hat{x}}{\text{maximize}} \sum_k \sum_i w_i^k x_i^k \log_2 \left( \frac{G_i^{k,k} p_i^k}{\left(G_i^{k,k} \tilde{Z} \operatorname{diag}(\hat{p})\hat{x}\right) \left[\sum_{c=1}^{k-1} N_c + i\right] + (\sigma_i^k)^2} + 1 \right) \quad (37)$$

subject to $x_i^k \in \{0, 1\}$, $\forall\, i, k$, $\sum_i p_i^k x_i^k \le P_{max}^k$, $$\forall\, k,\ \frac{G_i^{k,k} p_i^k x_i^k}{\left(G_i^{k,k} \tilde{Z} \operatorname{diag}(\hat{p})\hat{x}\right)\left[\sum_{c=1}^{k-1} N_c + i\right] + (\sigma_i^k)^2} \ge \gamma_i^k x_i^k, \quad (10)$$

$\forall\, i, k$, where user i in cell k has its own corresponding weight $w_i^k$, SINR requirements $\gamma_i^k$, and receiving noise $(\sigma_i^k)^2$. The same procedure follows to transform the optimization problem into the MIQCQP formulation. In the CoMP setting, it is assumed that the scheduler has the full knowledge of the path gain, channels, and waveforms of the system. If the full knowledge of the system is too expensive to obtain, some of the components can be approximated and the MIQCQP formulation still applies.

Channel Estimation

In some implementations of this invention, the channel impulse response (CIR) values necessary to perform the above calculations can be obtained using Golay sequences. This approach provides an efficient way to perform cross-correlation, providing a low complexity solution and a clear, side-lobe-free correlation peak. The Golay complementary sequences provide a set of complementary sequence pairs $G_a$ and $G_b$ of the same length $L_G$. The correlation of $G_a$ with itself, i.e. Corr $(G_a, G_a)$ has a prominent peak, but it also has noisy sidelobes. However, Corr $(G_a, G_a)$+Corr $(G_b, G_b)$ produces a single maximum peak with no sidelobes. This prominent peak is useful in channel estimation because a clean copy of channel estimation can be obtained at the peak without the interference from the sidelobes. The generation of $G_a$ and $G_b$ is based on two different sequences $D_n$ and $W_n$ of length n, and the length of the generated Golay sequence is $L_G = 2^n$.

A channel estimation scheme using a $8L_G$ by 1 probing sequence $\phi$ is composed of the corresponding pair of Golay sequences $G_a$, $G_b$ as $$\phi = [G_a^T G_b^T\ -G_a^T G_b^T\ G_a^T\ -G_b^T G_a^T G_b^T]^T. \quad (38)$$

The transmitter transmits the channel estimation sequence $\phi$ and the receiver receives the $L+8L_G-1$ by 1 signal $s=\phi*h+n$, where L is the length of h. We assume n is additive white Gaussian noise (AWGN) with zero mean and variance $\sigma^2$. The received signal s is divided into two branches. One branch goes through a delay of $2L_G$ and is summed with the other branch as $R_d$.

$$R_d = \left( \begin{bmatrix} I_L \\ 0_{2L_G,L} \end{bmatrix} + \begin{bmatrix} 0_{2L_G,L} \\ I_L \end{bmatrix} \right) s. \quad (39)$$

We calculate the correlation of $R_d$ with $G_a$ and $G_b$ using the Golay correlator block, which produces two branches $R_a$ and $R_b$, respectively. We define $C_a$ and $C_b$ as the $L+3L_G-1$ by $L+2L_G$ convolution matrix constructed by the time-reversed version of $G_a$ and $G_b$, and the outputs of the Golay correlator can be expressed as $R_a = C_a R_d$ and $R_b = C_b R_d$. $R_b$ is delayed by $3L_G$ and summed with $R_a$ in order to produce the final channel estimation result. Therefore, the whole estimation block can be expressed as $$y = \begin{bmatrix} I_{L+3L_G-1} \\ 0_{2L_G,L+3L_G-1} \end{bmatrix} C_a R_d + \begin{bmatrix} 0_{2L_G,L+3L_G-1} \\ I_{L+2L_G-1} \end{bmatrix} C_b R_d \quad (40)$$

$$= T(\phi * h + n) = \begin{bmatrix} T_1 \\ \Phi \\ T_2 \end{bmatrix} (\phi * h + n).$$

The matrix T is the total transfer function from the estimation block input s to the block output, and it is separated into three parts $T_1$, $\Phi$, and $T_2$ by the rows. $T_1$ and $T_2$ represent the noisy part of the channel estimation scheme which is the sidelobes of the correlation of $G_a$ and $G_b$, and these two parts are of no interest in channel estimation. $\Phi$ is the $(7L_G)^{th}$ to the $(8L_G)^{th}$ rows that correspond to the clean peak of the correlation of the Golay sequences without sidelobes. $\Phi$ is a matrix that is determined by the Golay sequence pair, and each row of $\Phi$ has exactly $4L_G$ none zeros entries with amplitude 1. The channel estimation $\hat{h}$ of length $L_G+1$ can therefore be represented as $$\hat{h} = \Phi(\phi * h + n) = 4L_G h' + \Phi n = 4L_G h' + n_e, \quad (41)$$

where h' is of length $L_G+1$ which is formed by zero-padding h to match the matrix dimension, and $n_e$ is the channel estimation error due to the received noise n at the receiver.

MAC Scheduling with Rate Adaptation

In some implementations of this invention, in addition to selecting a subset of users to be scheduled for a particular transmission resource, the transmission rate of the users can also be adjusted to achieve even more efficient wireless transmissions. This applies to both TR and MMIMO systems. There are multiple ways to adjust the transmission rate, including, e.g., the use of variable-rate spreading codes, the use of variable-rate error correcting codes, changing the used data symbol constellation size, and changing the rate back-off factor. The following paragraphs describe a particular implementation using the TR system and adjusting the transmission rate back-off factor. The same principles can also be applied to MMIMO systems. The main difference between the previously described scheduling algorithm and the one described below is that in the scheduling algorithm described below the transmission rate is also a parameter that is selected for each user, in addition to the decision on whether a particular user is selected for transmission for a particular transmission resource.

Suppose that there are N users in the system and each user's back-off factor $D_i$ is chosen from a set $\{D^1, D^2, \ldots, D^M\}$, in which M is the number of available back-off factor settings to the users. We assume that the application layer tolerates transmission delays, but not transmission errors caused by bit/packet errors that require retransmission. In order to reduce the transmission errors, each user has a minimum SINR constraint $\Gamma_i$ and can only transmit when the SINR is larger than $\Gamma_i$. Given the $\Gamma_i$, the transmission rate is denoted as $W \log_2 (1+\Gamma_i)/D_i$, in which W is the bandwidth of the TR system, and $D_i$ is the adapted back-off factor. The weight $\alpha_1$ is assigned to each of the users to reflect the relative importance between the users. We denote the allocated power assigned by physical layer and the path gain for user i as $p_i$ and $G_i$, respectively. We denote the maximum system power as $P_{max}$. Based on this setup, the rate maximization by optimizing back-off factor adaptation and user selection can be formulated as $$\underset{x_i, D_i}{\text{maximize}} \quad W \sum_i \frac{\alpha_i x_i \log_2(1+\Gamma_i)}{D_i} \qquad (42)$$

$$\text{subject to} \quad x_i \in \{0,1\}, \forall i, \sum_{i=1}^{N} p_i x_i \leq P_{max}$$

$$\frac{p_i G_i x_i}{G_i Z_i + \sigma_i^2} \geq \Gamma_i x_i, \forall i,$$

where $x_i$ is the decision variable and $x_i=1$ denotes that user i is selected for transmission. The term $Z_i$ is the total interference to user i, which is a function of the decision variables $x_i$, the power allocated $p_j$, the back-off factors $D_i$, the channel $h_i$ and the waveform $g_i$ of all the users in the network. The objective function is not convex and the decision variables appear on both the numerator and denominator of the objective function, so it is difficult to obtain the optimal solution by solving the problem directly without transformation. The detailed operation of the back-off factor adaptation can be summarized as Algorithm 3.

---
Algorithm 3 Backoff Rate Factor Adaptation
---
1: /** User Association Phase **/
2: New arrival user i broadcasts the required back-off rate set $D_i$ and the SINR constraint $\Gamma_i$.
3: The BS optimizes the backoff factors for all the associated users via expression (42).
4: The BS assigns the backoff factors to the corresponding users.
5: /** Base Station Transmission Phase **/
6: The BS transmits data to the users with the optimized back-off factors.

---

To efficiently solve problem (42), we convert the optimization problem to an MIQCQP problem that can be solved with much lower complexity as described below.

First, for the brevity of notation and analysis, we assume that the back-off factor satisfies $D^{m+1}=kD^M$, in which k is the ratio between successive back-off factors. We assume $R_i=W \log_2(1+\Gamma_i)/D^1$ and the rate using $D^m$ is $R_i/k^{m-1}$ due to the fixed ratio between the back-off factors. Each user i has a binary decision vector $x_i$ of size M, defined as $$x_i = [x_i^1 x_i^2 \ldots x_i^M]^T. \qquad (43)$$

When user i is adapted with back-off rate $D^m$, $x_i^1 = x_i^2 = \ldots = x_i^m = 1$ and other entries in $x_i$ are 0. The decision vector $x_i$ is constructed in such a way that we can optimally allocate the back-off factor and select a subset of users for transmission simultaneously. The decision vector x can be considered a "rate indicator" because it provides information for determining the transmission rate at which data are transmitted by the users. By the requirement of the decision vector, $x_i^1=1$ when user i is selected for transmission, no matter which back-off factor is adapted. We define the decision vector x to be the concatenation of the decision vector of all users as $$x = [x_1^T x_2^T \ldots x_N^T]^T. \qquad (44)$$

We define the rate vector $r_i$ as a vector of size M as $$r_i = \left[ A_i R_i - a_i \frac{k-1}{k} R_i - a_i \frac{k-1}{k^2} R_i \ldots -\alpha_i \frac{k-1}{k^{M-1}} R_i \right]^T. \qquad (45)$$

Therefore, $r_i^T x_i$ is the transmission rate of user i with the adapted back-off factor. Let r be a vector of size NM with entries $$r = [r_1^T r_2^T \ldots r_N^T]^T, \qquad (46)$$

and the system throughput is a linear function that can be expressed as $r^T x$. The constraints of the optimization formulation is listed as follows. First, the decision variables are binary, $$x_i^m \in \{0,1\}, i=1, \ldots, N, m=1, \ldots, M. \qquad (47)$$

If user i selects to use back-off factor $D^m$, then $x_i^1 = x_i^2 = \ldots = x_i^m = 1$ and other entries are 0. This translates to another set of constraints on the decision variable as $$x_i^{m+1} \leq x_i^m, \forall i, m=1, \ldots, M-1. \qquad (48)$$

The third constraint is that the sum of allocated power cannot exceed the maximum transmitting power of the base station. Let p be an all zero vector of size NM, except that $p((i-1)M+1)=p_i$, $i=1, \ldots, N$. The constraint on the total power consumption becomes $$p^T x \leq P_{max}, \qquad (49)$$

where $p((i-1)M+1)$ is multiplied with $x_i^1$ which is 1 whenever user i is selected to transmit. In order to convert the constraint on each user's SINR, we need to calculate the normalized interference with unit power channel $h_i$ and unit power waveform $g_i$. The actual interference can be calculated by multiplying the transmit power $p_i$ and the channel gain $G_i$ with the corresponding normalized interference terms. To characterize the normalized IUI and ISI for user i under the adapted back-off factors, we first define several terms. Let $I_i^m$, m=1, 2, ..., M be defined as $$I_i^1 = \sum_{l=-\frac{L-1}{D^1}, l \neq 0}^{\frac{L-1}{D^1}} |(h_i * g_i)[D^1 l]|^2, \qquad (50)$$

and for m>1, $$I_i^m = \sum_{l=-\frac{L-1}{D^m}, l \neq 0, \frac{D^{m-1}}{D^m} \neq integer}^{\frac{L-1}{D^m}} |(h_i * g_i)[D^m l]|^2. \qquad (51)$$

Let $I_{ij}^m$, m=1, 2, ..., M be defined as $$I_{ij}^1 = \sum_{l=-\frac{L-1}{D^1}}^{\frac{L-1}{D^1}} |(h_i * g_j)[D^1 l]|^2, \qquad (52)$$

for m>1, $$I_{ij}^m = \sum_{l=-\frac{L-1}{D^m}, \frac{D^{m-1} l}{D^m} \neq integer}^{\frac{L-1}{D^m}} |(h_i * g_j)[D^m l]|^2. \qquad (53)$$

Denote $I_i$ to be the normalized ISI row vector of user i as $$I_i = [I_i^1 - I_i^2 \ldots -I_i^M], \qquad (54)$$

and denote $I_{ij}$ to be the normalized IUI row vector caused by user j to user i as $$I_{ij} = [I_{ij}^1 - I_{ij}^2 \ldots -I_{ij}^M]. \qquad (55)$$

By the construction of $I_i$ and the relation that $x_i^1 = x_i^2 = \ldots = x_i^m = 1$ if user i choose $D^m$, $I_i x_i$ is the normalized ISI of user i using back-off factor $D^m$. By the same token, $I_{ij} x_j$ is the normalized IUI of user j to user i with the adapted back-off factor. Let the interference row vector $z_i$ of user i be defined as $$z_i = [p_1 I_{i1} p_2 I_{i2} \ldots p_i I_i \ldots p_N I_{iN}], \quad (56)$$

where we multiply the allocated power $p_i$ of the users to the normalized interference. With the defined interference vector $z_i$, the total interference to user i due to IUI and ISI is $z_i x$, then the minimum SINR requirement can be expressed as $$\frac{p_i G_i x_i^1}{G_i z_i x + \sigma_i^2} \geq \Gamma_i x_i^1 \quad (57)$$

We define $Z_i$ to be an NM by NM all zero matrix, except that $[(i-1)M+1]$-th row is $z_i$, and define $q_i$ as an all zero vector of size NM except that $q((i-1)M+1) = \sigma_i^2/G_i - p_i/\Gamma_i$. The SINR requirement constraint is converted as $$\frac{p_i G_i x_i^1}{G_i z_i x + \sigma_i^2} \geq \Gamma_i x_i^1 \quad (58)$$

$$\equiv \frac{p_i}{\Gamma_i} x_i^1 \geq x_i^1 z_i x + \frac{\sigma_i^2}{G_i} x_i^1$$

$$\equiv x^T Z_i x + q_i^T x \leq 0$$

We denote $\lambda_j(Z_i + Z_i^T)$, $j=1, \ldots$, NM to be the eigenvalues of $Z_i + Z_i^T$ in non-decreasing order. By the Weyl's inequality, any constant $d_i \geq \lambda_1(Z_i + Z_i^T)$ will make $Q_i = Z_i + Z_i^T + d_i I_{NM}$ a positive semidefinite matrix, in which $I_N$ denotes an identity matrix with size N. We define 1 as the all one vector with corresponding dimension. We use the Weyl's inequality with the property $x_i^2 = x_i$ of the binary variables, and the SINR constraint for user i is $$\frac{1}{2} x^T (Z_i + Z_i^T + d_i I_{NM}) x + \left(q_i^T - \frac{d_i}{2} 1_{NM}\right) x \leq 0, \forall i \quad (59)$$

$$\equiv \frac{1}{2} x^T Q_i x + \left(q_i^T - \frac{d_i}{2} 1_{NM}\right) x \leq 0, \forall i.$$

Finally, the optimization problem is converted to an MIQCQP problem as follows $$\underset{x}{\text{maximize}} \quad r^T x \quad (60)$$

$$\text{subject to} \quad x_i^m \in \{0, 1\}, \forall i, m \quad x_i^{m+1} \leq x_i^m, \forall i, m$$

$$p^T x \leq P_{max}$$

$$\frac{1}{2} x^T Q_i x + \left(q_i^T - \frac{d_i}{2} 1_{NM}\right) x \leq 0, \forall i,$$

which can be solved with much lower complexity than the exhaustive search using standard numerical solver algorithms.

We evaluated the back-off rate adaptation algorithm in expression (42) and the equivalent form in expression (60) using computer simulations with the following setup. The number of users N is chosen from 4, 6, 8, 10. The path gain $G_i$ is generated by assuming the BS is located at the center of a 20 m-by-20 m area while the receivers are randomly distributed within the area. The pathloss exponent is chosen to be 3.5 and the bandwidth W is 125 MHz. The CIRs $h_i$ are generated based on a statistical channel model, and the waveforms $g_i$ are the time-reversed and conjugated CIRs, unless otherwise designed. The power $p_i$ is generated uniformly from 0.1 to 0.3 and the maximum power $P_{max}$ is 1. The signal to noise ratio is 0 dB and the SINR requirement $\Gamma_i$ is generated uniformly from 0.3 to 0.6. The weight $\alpha_1$ is generated uniformly from [0,1].

For each of the settings, we performed 5000 channel and location realizations. To obtain the optimal solution of the original optimization problem defined in expression (42), we performed an exhaustive search by assuming all users choose the same back-off factor $D^1$. The performance metric is measured by comparing the back-off rate adaptation algorithm with the result of the exhaustive search in terms of absolute weighted sum rate and the weight sum rate ratio. We evaluated the performance of the back-off rate adaptation algorithm by comparing the weighted sum rate against the case when the users have to use fixed $D^1$.

FIG. 11 is a graph 260 that shows the average weighted sum rate with M=2, k=4 using different $D^1$s and the case when users use fixed $D^1$. Results show that the back-off rate adaptation algorithm outperforms in all simulated cases than the fixed $D^1$ case. The increase of throughput is larger when $D^1$ is small, i.e. when the IUI and ISI are more severe. Two conclusions can be made according to the result. First, the back-off rate adaptation algorithm effectively adjusts $D_i$ for the users, manages the interference and increases the system weighted sum rate. Second, the algorithm is more effective in crowded networks having severe interference because some users can use larger back-off factors for transmission and reduce the interference to others. This is desirable when a large number of users are present in the network.

In order to show the relative increase in the throughput with the back-off rate adaptation algorithm, we calculate the ratio $\rho$ between the throughput that can be obtained by using the MIQCQP algorithm $R_{MIQCQP}$ and the throughput $R_{fixed}$ obtained by using fixed $D^1$s, i.e. $\rho = R_{MIQCQP}/R_{fixed}$. FIG. 12 is a graph 270 that shows the average ratio $\rho$ with M=2, different $D^1$s and k={2, 4}. All values of the ratio $\rho$ are above 1 in all scenarios that we simulated, which shows that the back-off rate adaptation algorithm increases the system throughput. When N is large, the exhaustive search has more flexibility in choosing the optimal set of simultaneously transmitting users, so the ratio $\rho$ decreases a little with the increase of N. The second observation is that the ratio $\rho$ increases with k, which results in a higher total throughput due to the much lowered interference at the cost of reduced individual transmission rates of some users.

The various algorithms described above can be used to generate medium access layer parameters that can improve a utility of the terminal devices while allowing each of the terminal devices to have a minimum quality of service that is equal to or greater than a threshold. For example, the utility can be function of signal-to-interference ratios each associated with a particular terminal device of a set of terminal devices in the network, signal-to-noise ratios each associated with a particular terminal device, signal-to-interference-plus-noise ratios each associated with a particular terminal device, data rates each associated with a particular terminal device, error rates each associated with a particular terminal device, throughputs each associated with a particular terminal device, transmission delays each associated with a particular terminal device, availability parameters each associated with a particular terminal device, or jitter parameters each associated with a particular terminal device. For example, the minimum quality of service requirement can be based on a function of signal-to-interference ratios each associated with a particular terminal device of a set of terminal devices of the network, signal-to-noise ratios each associated with a particular terminal device, signal-to-interference-plus-noise ratios each associated with a particular terminal device, data rates each associated with a particular terminal device, error rates each associated with a particular terminal device, throughputs each associated with a particular terminal device, transmission delays each associated with a particular terminal device, availability parameters each associated with a particular terminal device, or jitter parameters each associated with a particular terminal device.

Physical, Transport and Logical Channel Structure

In a network shared by different users, medium access control (MAC) design defines the transmission protocol on the shared medium. The components of MAC distribute the shared transmission resources, either in time or frequency, to different users with different requirements, such as required transmission rate, error rate, and maximum delay, by proper allocation of transmission resources among the users. MAC protocol design coordinates the transmission behavior among users, and sustains the network throughput and maintains the quality of service (QoS) of the users as the number of users in the network increases. In order to support the physical layer operations such as ensuring a low error rate for transmissions and to sustain the network throughput of the TR system, it is useful to design a TR MAC protocol that supports the growing number of users by coordinating the user association between APs (i.e., coordinating which user is associated with which AP) based on the different CIRs of the users. It is also useful to design the TR MAC protocol such that it alleviates the strong-weak focusing effect between users by efficient transmission resource allocation in time and transmission power, schedules the users according to the channel information and heterogeneous user requirements, and accommodates devices with heterogeneous hardware constraints in the TR network.

As another aspect of this invention, we describe a MAC framework that defines different channels in the physical and MAC layers and the frame structure. The channel mapping between the physical channels, transport channels, and logical channels are defined in the table below.

| Logical channel | Transport channel | Physical channel |
| --- | --- | --- |
| Broadcast control channel (BCCH) | Broadcast channel (BCH) | Primary common control physical channel (PCCPCH) |
| Paging control channel (PCCH) | Paging channel (PCH) | Secondary common control physical channel (SCCPCH) Page indicator channel (PICH) |
| Common control channel (CCCH) | Forward access channel (FACH) | Secondary common control physical channel (SCCPCH) Acquisition indication channel (AICH) |
| Common control channel (CCCH) | Random access channel (RACH) | Physical random access channel (PRACH) |
| Dedicated control channel (DCCH) | Dedicated channel (DCH) | Dedicated physical control channel (DPCCH) |
| Dedicated traffic channel (DTCH) | | Dedicated physical data channel (DPDCH) |

In the table above, the transport channel defines how data is transferred over the air interface, and the logical channel defines what type of information is transferred, e.g. signaling or user data. There are five types of transport channels:

Broadcast channel (BCH): The network broadcasts on the broadcast channel continuously, repeating the system information message at a configurable rate. The user device reads this channel after power-up or when camping on a new cell and periodically thereafter so that the user device has the current system information.

Paging channel (PCH): The network notifies the user of incoming traffic using the paging channel. PCH is mapped to SCCPCH. The user will typically monitor the PICH during assigned slots and the PICH only contains indicator bits (on/off) indicating whether there will be messages transmitted on the SCCPCH. The SCCPCH will contain user ID.

Random and forward access channels: The random and forward access channels are used by the user and the network to communicate when the user does not have a dedicated channel allocated to it yet. The RACH has an access protocol associated with it and the user transmits a preamble (indicating user ID) and the network will respond on the AICH if the connection is established. When the network receives a message on RACH, it responds on FACH, which is mapped to SCCPCH. This may be the same physical channel carrying the PCH, or the network can have multiple SCCPCHs. If the channel is allocated (dedicated mode), then CCCH becomes DCCH, and FACH will be used to transmit user data, too.

Dedicated channels: Dedicated channels are used to carry signaling and user data. DCCHs and DTCHs may be multiplexed onto a single DCH transport channel or each may be assigned an individual DCH. The DPCCH carries control information (e.g., pilot, power control, and rate bits) generated at the physical layer.

In some examples, a MAC packet may be sent from a base station to a user equipment in downlink, or from a user equipment to a base station in uplink. The MAC packet may be sent from the physical layer to the MAC layer, and may be used to assist in correct reception of data packets and improve resource utilization. The MAC packet may have a header that includes various information. For example, the MAC packet header can include (1) target channel type field (TCTF) to indicate what type of logical channel it is, (2) logical channel number if there are multiple logical channels of the same type mapped to one transport channel, (3) user ID, and (4) user ID type. The MAC parameters can include (1) user ID, (2) configuration information, e.g. information on how logical channels are mapped onto transport channels, (3) transport format information, e.g., what rate to be used in MAC (i.e., the rate at which the MAC packet is transmitted), and selection of transport block sizes based on the instantaneous source rate in order to maximize the physical channel resource utilization, (4) traffic volume measurements that can be used in the resource allocation algorithm (e.g., any resource allocation algorithm in the MAC layer) and to determine the rate requirement, and (5) the index of the RACH protocol and the parameters for the RACH protocol.

Because the TR technique benefits more from a wide bandwidth operation, code division multiplexing (CDM) and time division multiplexing (TDM) can be used to separate the channels in the physical layer. Dedicated channels can be spread using a certain spreading factor (SF) and then scrambled with PN codes, e.g., gold codes for data channels and Golay codes for control channels. The CIR or other signature waveforms are then added as a pre-filter or pre-equalization. Each cell/base station has a specific primary scrambling code, and the users are separated with secondary scrambling code if there are not enough near-orthogonal Golay codes. Channels of the same type use the same SF, and different types of channels are distinguished with codes on different branches of an orthogonal variable spreading factor (OVSF) code tree.

In terms of timing relationship, downlink (DL) transmission should happen before uplink (UL) because the users need to first obtain system information. In some implementations, time is divided into frames and a frame includes multiple slots. Each slot in a frame is for either DL or UL. There can be a single switch point or multiple switch points, configured for symmetric or asymmetric traffic. Here, the "switch point" refers to the transition point from the uplink slot to the downlink slot, or from the downlink slot to the uplink slot. SCH, PCCPCH, and CPICH should be aligned on the same boundary. UL scheduling information can be carried on UL DPCCH that is some frames prior to UL DPDCH. HARQ indicator of the UL DPDCH can be carried on UL DPCCH some frames after UL DPDCH. PICH should be some frames prior to the paging information on SCCPCH. PRACH should be earlier than AICH. More details on the physical layer channels are summarized below.

PCCPCH carries information about the system and the cell/AP. It should be time multiplexed with synchronization channel (SCH). The system information message should include message type and system frame number (SFN) for timing purpose. There should be at most one PCCPCH per cell.

SCCPCH carries PCH and FACH transport channels, which can be mapped to the same or different SCCPCH. PCH carries paging notification to the user which is signaled on the PICH to listen to the SCCPCH frame. FACH carries control signaling and short bursts of user data packets and it is used when the user is in the state when it has no dedicated channel. There can be multiple SCCPCH per cell and time offset between SCCPCH and PCCPCH is allowed.

SCH is used for timing synchronization with the cell/AP. There can be primary and secondary SCH, which are code multiplexed, for coarse and fine timing synchronization.

Common pilot channel (CPICH) provides in-cell timing reference, which uses pre-defined symbol sequence. CPICH can be used for signal quality estimation for handover and reselection. It should be aligned with SCH in time. There can be primary and secondary CPICH if needed, and they should have the same scrambling code with PCCPCH.

PICH carries paging indicators (PI) and different users' PI in the PICH frame is randomized for fairness.

AICH carries acquisition indicators (AIs) to notify the user that the preamble on the RACH was heard and the RACH message can be transmitted. It is aligned with SCH in time.

PRACH carries both the preamble (serving as user ID) and RACH message. The preamble is short and the length of the PRACH message can be adjustable. The PRACH message includes data and control signals, in which a control field includes pilot for channel estimation and transport format information. The data and control part are code multiplexed and each user uses one code from a set of long scrambling codes. Different users' PRACH sub-channels are time division multiplexed.

Downlink DPCH is a single channel and the DPDCH and DPCCH are time multiplexed. The DPCCH carries physical layer control information such as DPCH synchronization, transmit power control (TPC), and transport formation information, etc.

Uplink DPCH is made up of DPDCH and DPCCH sent simultaneously. DPCCH contains pilot for synchronization, channel re-probing and TPC, transport formation, and feedback information. UL DPCCH and DPDCH use different spreading factors, and UL DPCCH should be transmitted prior to the initial DPDCH transmission because data decoding needs control information. DL DPCH should be transmitted before UL DPCH.

Random Access Procedure

An important procedure for the users to join the system/network is the initial acquisition procedure. The new user first needs to find the primary scrambling code (PSC) so as to demodulate the PCCPCH to obtain system information, in which the user needs to (1) search and find the SCH, acquire the primary (and maybe secondary) SCH, and (2) listen to the CPICH and find the PSC. If the new user can hear multiple APs, the new user uses the CPICH strength and the loading information of each surrounding cell to decide the serving cell. After the serving cell is selected, the user can register to the cell by starting a random access procedure.

The random access procedure includes the following steps:

After the serving cell is selected, the new user can know the system information from the PCCPCH, which contains system parameters, e.g., the maximum number of transmissions of the access request message, initial power, the increase in power in each access trial, etc.

The new user randomly selects one of the m slots in the UL part of a frame, sends the initial access request on PRACH, and waits for a response on AICH. The access request message contains the user ID that can be selected from a pre-defined set of preambles.

The AP processes the access requests, and transmits an acquisition indicator on the AICH to a user if its access request is acknowledged.

If the request message power is not high enough for the AP to decode the preamble information, the user is allowed to increase the power up to a maximum number of trials.

If the user obtains its ID information on the AICH, it can send confirmation in the following PRACH.

The time duration of the PRACH can be configured according to the number of new users trying to get access simultaneously.

After the initial access request is acknowledged, the user can send a PRACH message for channel estimation, using the pilot signal included in the PRACH control message. We assume DL and UL channel reciprocity, so the UL channel estimate is used for the DL waveform design and UL detection. Different users can use different scrambling codes to separate their pilots, and the scrambling code index can be determined by the user ID or a random seed function of the user ID, known to both the AP and the user at initialization. Because different UL channels use different spreading codes, and different users' PRACH use different scrambling codes, we can ensure near orthogonality of the pilots from users in the same cell, and we allow more than one user to send pilots simultaneously. If near orthogonality cannot be achieved due to a large number of users, we can use TDM on top of CDM for channel probing.

Channel re-probing may be necessary when there is a change in the environment and can be performed by the system periodically or on-demand. Periodic channel re-probing can save signaling overhead, in which the period of the channel re-probing is pre-configured according to empirical measurements in a similar environment. Due to the change in the environment, the system may need to adjust the frequency of the channel re-probing by use of an on-demand re-probing process, which is triggered by the measurement report that indicates channel quality, e.g., packet failure rate. Because channel re-probing happens after the user is registered at the AP, the user can use the pilot in the UL DPCCH to assist in channel re-probing. For example, there can be a predefined field that signals a request for re-probing. A particular bit of a packet may be used as an indicator in which if the bit has a value of '1' it indicates there is a request for re-probing. Thus, when bit '1' is decoded in the indicator field of the UL DPCCH, we know the user requests re-probing. Once the AP reads the indicator, the AP will re-estimate the channel impulse response.

Examples of Wireless Systems

Figure 16:
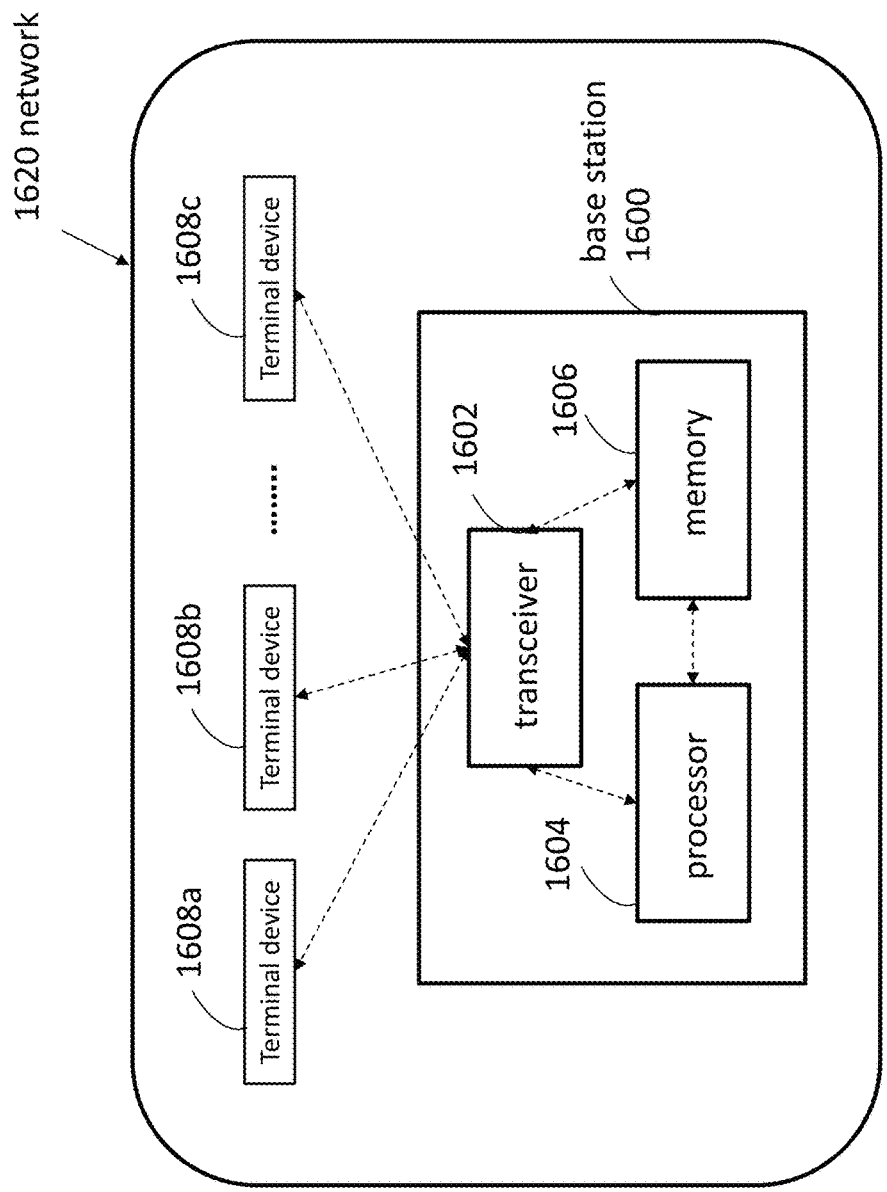
FIGS. 16-18 are block diagrams of time-reversal communication systems or networks.

Referring to FIG. 16, in some implementations, a time reversal communication system or network 1620 includes base stations 1600 (only one is shown in the figure) and terminal devices (e.g., 1608a, 1608b, 1608c, collectively referenced as 1608). The base station 1600 includes, e.g., a transceiver 1602 for wirelessly communicating with the terminal devices 1608a, 1608b, 1608c. The base station 1600 includes at least one processor 1604 and a memory device 1606 communicatively coupled with the at least one processor 1604. The memory device 1606 may store a set of instructions to be executed by the at least one processor 1604 to cause the base station 1600 to receive a set of channel probing signals from the terminal devices 1608 through wireless multipath channels to the base station 1600, determine channel impulse responses for the set of multipath channels associated with the terminal devices 1608, and determine location-specific signature waveforms based on the channel impulse responses for the set of multipath channels associated with the terminal devices 1608. Each of the location-specific signature waveforms is associated with a particular location of the respective terminal device 1608 and is based on a time-reversed waveform of the corresponding channel impulse response. The instructions when executed by the at least one processor 1604 may further cause the base station 1600 to generate a set of medium access layer parameters, in which each of the set of medium access layer parameters is associated with a particular one of the terminal devices 1608. The instructions when executed by the at least one processor 1604 may further cause the base station 1600 to generate, for each particular terminal device 1608, transmit data signals based on data intended for the particular terminal device 1608, the particular medium access layer parameter, and the particular location-specific signature waveform, in which the transceiver 1602 transmits the transmit data signals wirelessly to the terminal devices 1608.

Figure 17:
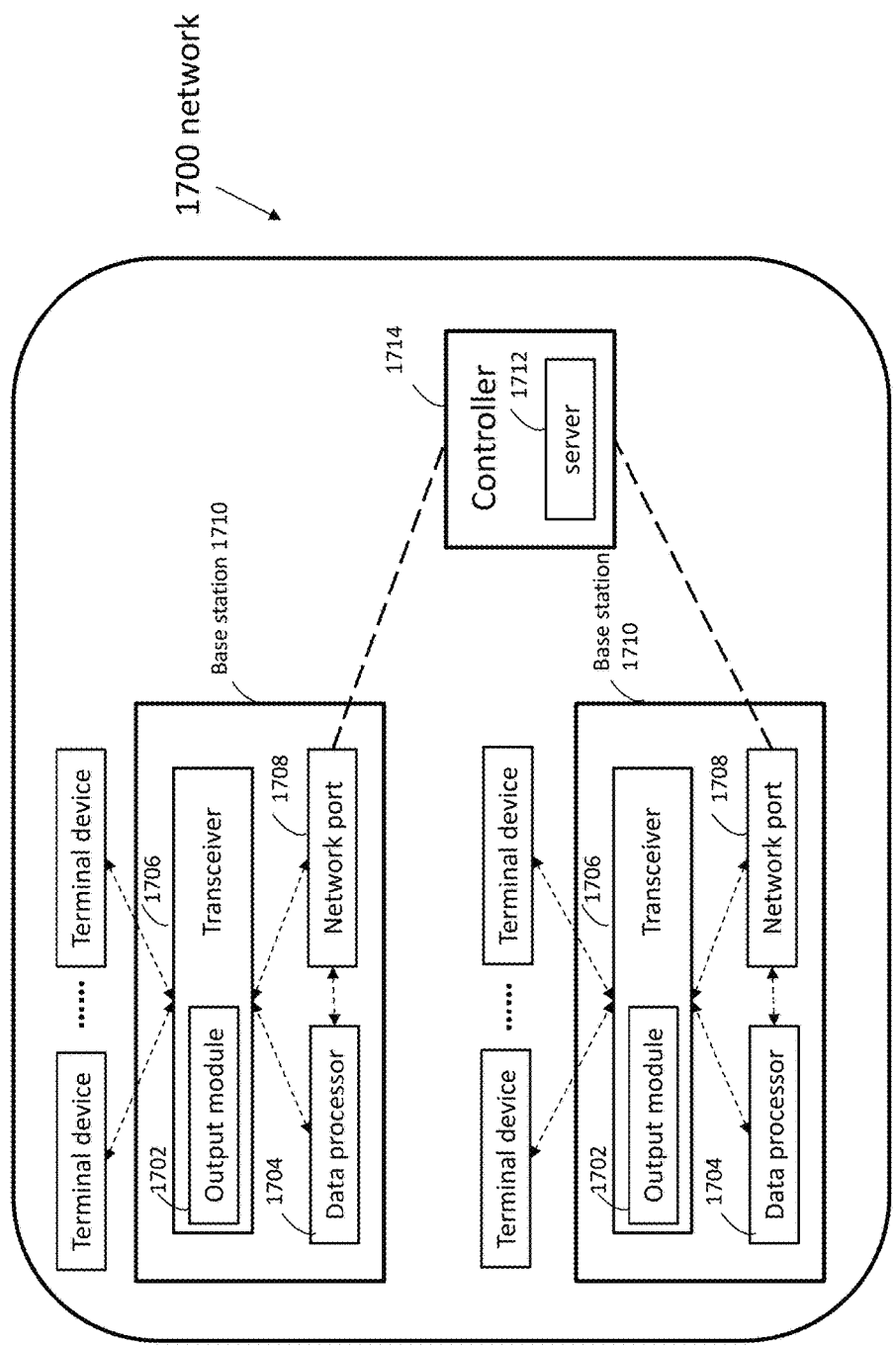

Referring to FIG. 17, in some implementations, a time reversal communication system or network 1700 uses a centralized protocol for user/network association. The network 1700 includes base stations 1710 that communicate with a controller 1714 that includes a central server computer 1712 for determining associations between base stations and terminal devices, e.g., determining which terminal device should be associated with which base stations in order to achieve a certain goal, such as maximizing the sum rate of the system while meeting certain quality metrics for each terminal device.

In this example, each base station 1710 includes a network port 1708 for connecting to the controller 1714, a transceiver 1706 for wirelessly communicating with terminal devices, and at least one data processor 1704. The transceiver 1706 receives at least one channel probing signal from the terminal devices that intend to communicate with the base station 1710. The at least one data processor 1704 is configured to, for each of the terminal devices that intend to communicate with the base station 1710, determine a metric based on the received at least one channel probing signal from the terminal device. The base station 1710 sends the metric and current load information to the server 1712, and for each of the terminal devices that intend to communicate with the base station 1710, the server 1712 calculates an association indicator indicating whether the terminal device can be associated with the base station 1710 based on at least one of the metric or the load information. The server 1712 sends the association indicators to the base station 1710. The base station 1710 determines which terminal device can be associated with the base station 1710 and sends a confirmation to the terminal device indicating that the terminal device can connect to the base station 1710.

For each of the terminal devices that can be associated with the base station 1710, the base station 1710 determines a signature waveform based on a time-reversed waveform of a channel response signal derived from the corresponding received at least one channel probing signal from the terminal device, and determines a respective downlink transmit signal for the respective terminal device based on respective downlink data and the respective signature waveform. The transceiver 1706 includes an output module 1702 to transmit respective downlink signal to the respective terminal device.

Figure 18:
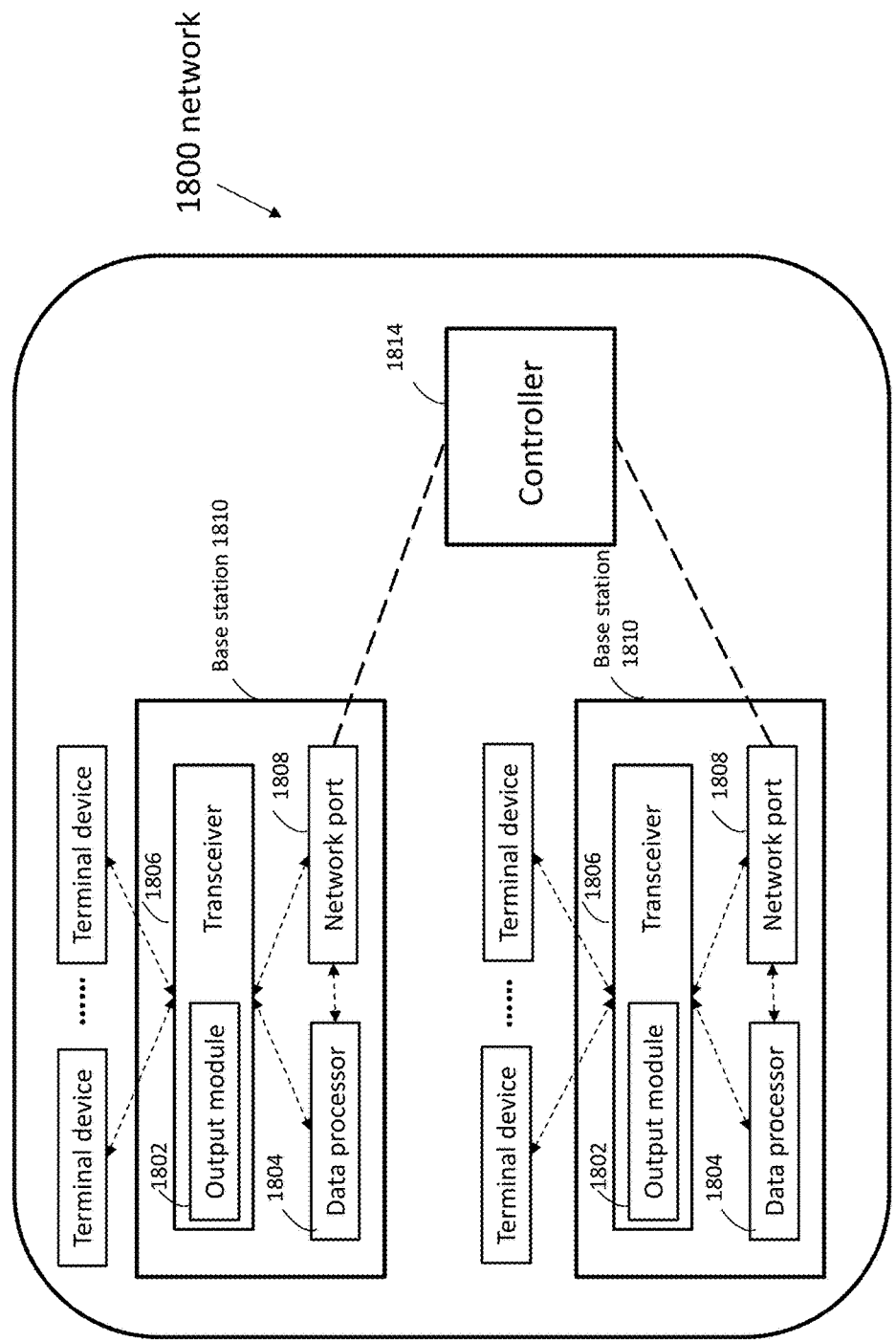

FIG. 18 shows another example of a time reversal communication system or network 1800 in which base stations 1810 communicates with a controller 1814, and the terminal devices are associated with the base stations 1810 based on a distributed user/network association protocol. In this example, each base station 1810 includes a network port 1808 for connecting to the controller 1814, a transceiver 1806 for wirelessly communicating with terminal devices, and at least one data processor 1804, wherein the transceiver 1806 comprises an output module 1802. The transceiver 1806 broadcasts at least one of a beacon signal or a current load information of the base station to the terminal devices that intend to communicate with the base station 1810. The load information refers to the number of terminal devices that are currently associated with the base station 1810. Each of the terminal devices determines a metric based on at least one of the received beacon signal or the current load information, determines a priority list of the set of base stations 1810 based on the metric, and sends a request to each of the base stations 1810 according to the priority list. At the base station 1810 that receives requests from the terminal devices, for each of the terminal devices that sends the request, the data processor 1804 is configured to determine an association indicator indicating whether the terminal device can be associated with the base station 1810. And for each of the terminal devices that can be associated with the base station 1810, the data processor 1804 is configured to determine a signature waveform based on a time-reversed waveform of a channel response signal derived from at least one channel probing signal that is sent from the terminal device, and determine a respective downlink transmit signal for the respective terminal device based on the respective downlink data and the respective signature waveform. The output module 1802 then transmits the respective downlink signal to respective terminal device.

The controller 1814 can be, e.g., a radio network controller for coordinating the communications between the base stations 1810. For example, in a multi-cell network when the base stations 1810 need to jointly schedule resources to the terminal devices to optimize the resource utilization, the controller 1814 can control the signaling and resource allocation among the base stations 1810.

The MAC layer design described in this document provides several advantages compared to conventional MAC layer designs. The new MAC layer described above provides improvements in the scheduler, rate adaptation, and user association. First, the scheduler design described in this document is general and can work for both TR and MMIMO, as long as the interference matrix is calculated properly for the specific base station, i.e., either the TR or the MMIMO. The scheduler design can also be applied to the design of an uplink scheduler and a scheduler in a multi-cell network, by replacing the interference matrix with a properly calculated interference matrix. Moreover, the original non-convex optimization is converted to a MIQCQP, which can be solved more efficiently than using exhaustive search. Second, the rate adaptation by adjusting the rate back-off is unique to TR, since in TR the rate back-off should be carefully designed to mitigate the inter symbol interference and inter-user interference especially when there exists more than one user. Moreover, the original non-convex optimization is converted to a MIQCQP, which can be solved more efficiently. Third, the user-BS association is also general and can work for both TR and MMIMO. Solving the original optimization problem, e.g., expression (10) may be complicated. We converted the original optimization problem to expression (14), which is only a linear search, and the distributed user association in expression (16) is even simpler. Fourth, for the physical layer and the MAC layer channel mapping/demapping, the users are differentiated using the location-specific signature in time-reversal systems instead of code-division multiplexing that is used in CDMA-based systems.

Conventional MAC designs used in convention communication systems using time-division multiplexing, frequency-division multiplexing, or code-division multiplexing may not be able to accommodate as many users as the MAC design for the time-reversal based communication systems described in this document because the time-reversal based systems use the dynamic location-specific signatures to separate different users. In the time-reversal system, if the channel impulse responses between a set of users are nearly orthogonal, e.g., by increasing the system bandwidth to resolve the number of multipaths, then more users can be allowed to transmit at the same time.

Each of the base stations, terminal devices, and controllers described above can include one or more processors and one or more computer-readable mediums (e.g., RAM, ROM, SDRAM, hard disk, optical disk, and flash memory). The one or more processors can perform various calculations described above. The calculations can also be implemented using application-specific integrated circuits (ASICs). The term "computer-readable medium" refers to a medium that participates in providing instructions to a processor for execution, including without limitation, non-volatile media (e.g., optical or magnetic disks), and volatile media (e.g., memory) and transmission media. Transmission media includes, without limitation, coaxial cables, copper wire and fiber optics.

The features described above involving data processing can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the invention have been described. Nevertheless, it will be understood that various modifications can be made without departing from the spirit and scope of the invention.

What is claimed is:

1. A base station of a time reversal communication system, comprising:
   at least one transceiver;
   at least one processor; and
   a memory communicatively coupled with the at least one processor, the memory storing a set of instructions to be executed by the at least one processor to:
   receive a set of channel probing signals from a set of terminal devices through a set of wireless multipath channels to the base station,
   determine channel impulse responses for the set of multipath channels associated with the set of terminal devices,
   determine location-specific signature waveforms based on the channel impulse responses for the set of multipath channels associated with the set of terminal devices,
      wherein each of the location-specific signature waveforms is associated with a particular location of the respective terminal device and is based on a time-reversed waveform of the corresponding channel impulse response,
   generate a set of medium access layer parameters,
      wherein each of the set of medium access layer parameters is associated with a particular one of the set of terminal devices, and
   generate, for each particular terminal device, downlink transmit data signals based on data intended for the particular terminal device, the particular medium access layer parameter, and the particular location-specific signature waveform,
      wherein the transceiver transmits the downlink transmit data signals wirelessly to the terminal devices.

2. The base station of claim 1,
   wherein each of the set of medium access layer parameters associated with a particular terminal device comprises a transmission indicator representing whether the particular terminal device is scheduled for transmission using a transmission resource.

3. The base station of claim 2, wherein the transmission resource comprises at least one of a time slot, a frequency band, or a code.

4. The base station of claim 1,
   wherein the set of medium access layer parameters are determined based on at least one of
   a set of weight coefficients each associated with a particular terminal device,
      a set of transmit power each associated with a particular terminal device,
      a set of path gains between the base station and the set of terminal devices,
      a power constraint of the base station,
      a set of quality of service requirements each associated with a particular terminal device, or
      a set of physical layer information each associated with a particular terminal device.

5. The base station of claim 1,
   wherein the set of medium access layer parameters are determined to improve a utility of the set of terminal devices while allowing each of the set of terminal devices to have a minimum quality of service that is equal to or greater than a threshold.

6. The base station of claim 5, wherein the utility is a function of at least one of
   a set of signal-to-interference ratios each associated with a particular terminal device of the set of terminal devices,
   a set of signal-to-noise ratios each associated with a particular terminal device of the set of terminal devices,
   a set of signal-to-interference-plus-noise ratios each associated with a particular terminal device of the set of terminal devices,
   a set of data rates each associated with a particular terminal device of the set of terminal devices,
   a set of error rates each associated with a particular terminal device of the set of terminal devices,
   a set of throughputs each associated with a particular terminal device of the set of terminal devices,
   a set of transmission delays each associated with a particular terminal device of the set of terminal devices,
   a set of availability parameters each associated with a particular terminal device of the set of terminal devices, or
   a set of jitter parameters each associated with a particular terminal device of the set of terminal devices.

7. The base station of claim 5, wherein the minimum quality of service comprises a function of at least one of
   a set of signal-to-interference ratios each associated with a particular terminal device of the set of terminal devices,
   a set of signal-to-noise ratios each associated with a particular terminal device of the set of terminal devices,
   a set of signal-to-interference-plus-noise ratios each associated with a particular terminal device of the set of terminal devices,
   a set of data rates each associated with a particular terminal device of the set of terminal devices,
   a set of error rates each associated with a particular terminal device of the set of terminal devices,
   a set of throughputs each associated with a particular terminal device of the set of terminal devices,
   a set of transmission delays each associated with a particular terminal device of the set of terminal devices,
   a set of availability parameters each associated with a particular terminal device of the set of terminal devices, or
   a set of jitter parameters each associated with a particular terminal device of the set of terminal devices.

8. The base station of claim 2, wherein each of the set of medium access layer parameters further comprise a rate indicator that has information for determining a transmission rate at which data are transmitted.

9. The base station of claim 8, wherein the transmission rate is adjusted by a rate back-off factor.

10. The base station of claim 1, wherein each of the set of channel probing signals comprises at least one of an impulse signal or a pseudo-random sequence.

11. A set of base stations of a time reversal communication system, each base station comprising:
   a network port for connecting to a network, wherein the network comprises a server;
   a transceiver to receive at least one channel probing signal from a set of terminal devices that intend to communicate with the base station; and
   a data processor configured to:
      for each of the terminal devices that intend to communicate with the base station,
         determine a metric based on the received at least one channel probing signal from the terminal device,
         wherein the base station sends the metric and current load information to the server, and wherein the server calculates an association indicator indicating whether the terminal device can be associated with the base station based on at least one of the metric or the load information, and for each of the terminal devices that can be associated with the base station, determine a location-specific signature waveform based on a time-reversed waveform of a channel response signal derived from the corresponding received at least one channel probing signal from the terminal device, wherein the location-specific signature waveform is associated with a location of the terminal device, and determine a respective downlink transmit signal for the respective terminal device based on respective downlink data and the respective location-specific signature waveform, wherein the transceiver comprises an output module to transmit the respective downlink transmit signal to the respective terminal device.

12. The set of base stations of claim 11,
wherein the metric is at least one of:
a signal-to-interference ratio,
a signal-to-noise ratio,
a signal-to-interference-plus-noise ratio,
a signal power,
a distance between the terminal device and the base station, or
a quality of service measure.

13. The set of base stations of the time reversal communication system of claim 11,
wherein the association indicator is determined to improve a utility of a set of terminal devices associated with the base station while allowing each of the set of terminal devices to have a minimum quality of service requirement that specifies that the quality of service needs to be equal to or greater than a predetermined threshold, in which the predetermined threshold is determined by the terminal device before the server calculates the association indicator.

14. The set of base stations claim 13, wherein the utility is a function of at least one of
a set of signal-to-interference ratios each associated with a particular terminal device of the set of terminal devices,
a set of signal-to-noise ratios each associated with a particular terminal device of the set of terminal devices,
a set of signal-to-interference-plus-noise ratios each associated with a particular terminal device of the set of terminal devices,
a set of data rates each associated with a particular terminal device of the set of terminal devices,
a set of error rates each associated with a particular terminal device of the set of terminal devices,
a set of throughputs each associated with a particular terminal device of the set of terminal devices,
a set of transmission delays each associated with a particular terminal device of the set of terminal devices,
a set of availability parameters each associated with a particular terminal device of the set of terminal devices, or
a set of jitter parameters each associated with a particular terminal device of the set of terminal devices.

15. The set of base stations of claim 13, wherein the minimum quality of service requirement comprises a function of at least one of a set of signal-to-interference ratios each associated with a particular terminal device of the set of terminal devices,
a set of signal-to-noise ratios each associated with a particular terminal device of the set of terminal devices,
a set of signal-to-interference-plus-noise ratios each associated with a particular terminal device of the set of terminal devices,
a set of data rates each associated with a particular terminal device of the set of terminal devices,
a set of error rates each associated with a particular terminal device of the set of terminal devices,
a set of throughputs each associated with a particular terminal device of the set of terminal devices,
a set of transmission delays each associated with a particular terminal device of the set of terminal devices,
a set of availability parameters each associated with a particular terminal device of the set of terminal devices, or
a set of jitter parameters each associated with a particular terminal device of the set of terminal devices.

16. A set of base stations of a time reversal communication system, each base station comprising:
a network port for connecting to a network,
a transceiver to broadcast at least one of a beacon signal or a current load information to a set of terminal devices that intend to communicate with the base station,
wherein each of the set of terminal devices configured to:
determines a metric based on at least one of the received beacon signal or the current load information,
determines a priority list of the set of base stations based on the metric, and
sends a request to each of the set of base stations according to the priority list, and
a data processor configured to:
for each of the terminal devices that sends the request, determine an association indicator indicating whether the terminal device can be associated with the base station, and
for each of the terminal devices that can be associated with the base station,
determine a location-specific signature waveform based on a time-reversed waveform of a channel response signal derived from at least one channel probing signal that is sent from the terminal device, wherein the location-specific signature waveform is associated with a location of the terminal device, and
determine a respective downlink transmit signal for the respective terminal device based on the respective downlink data and the respective location-specific signature waveform,
wherein the transceiver comprises an output module to transmit the respective downlink transmit signal to the respective terminal device.

17. The set of base stations of claim 16,
wherein the metric is at least one of:
a signal-to-interference ratio,
a signal-to-noise ratio,
a signal-to-interference-plus-noise ratio,
a signal power,
a distance between the terminal device and the base station, or
a quality of service measure.

18. The set of base stations of claim 16,
wherein the association indicator is determined to improve a utility of a set of terminal devices associated with the base station while allowing each of the set of terminal devices to have a minimum quality of service requirement that is equal to or greater than a threshold.

19. The set of base stations of the time reversal communication system of claim 18,
wherein the utility is a function of at least one of
a set of signal-to-interference ratios each associated with a particular terminal device of the set of terminal devices,
a set of signal-to-noise ratios each associated with a particular terminal device of the set of terminal devices,
a set of signal-to-interference-plus-noise ratios each associated with a particular terminal device of the set of terminal devices,
a set of data rates each associated with a particular terminal device of the set of terminal devices,
a set of error rates each associated with a particular terminal device of the set of terminal devices,
a set of throughputs each associated with a particular terminal device of the set of terminal devices,
a set of transmission delays each associated with a particular terminal device of the set of terminal devices,
a set of availability parameters each associated with a particular terminal device of the set of terminal devices, or
a set of jitter parameters each associated with a particular terminal device of the set of terminal devices.

20. The set of base stations of the time reversal communication system of claim 18,
wherein the minimum quality of service requirement comprises a function of at least one of
a set of signal-to-interference ratios each associated with a particular terminal device of the set of terminal devices,
a set of signal-to-noise ratios each associated with a particular terminal device of the set of terminal devices,
a set of signal-to-interference-plus-noise ratios each associated with a particular terminal device of the set of terminal devices,
a set of data rates each associated with a particular terminal device of the set of terminal devices,
a set of error rates each associated with a particular terminal device of the set of terminal devices,
a set of throughputs each associated with a particular terminal device of the set of terminal devices,
a set of transmission delays each associated with a particular terminal device of the set of terminal devices,
a set of availability parameters each associated with a particular terminal device of the set of terminal devices, or
a set of jitter parameters each associated with a particular terminal device of the set of terminal devices.

21. The set of base stations of claim 16, wherein the priority list is determined based on $(N+1)*d$, wherein N represents the current load information of the base station, and d represents a distance information based on the at least one of the received beacon signal.

* * * * *